INVENTOR.
WILLIAM F. SMITH

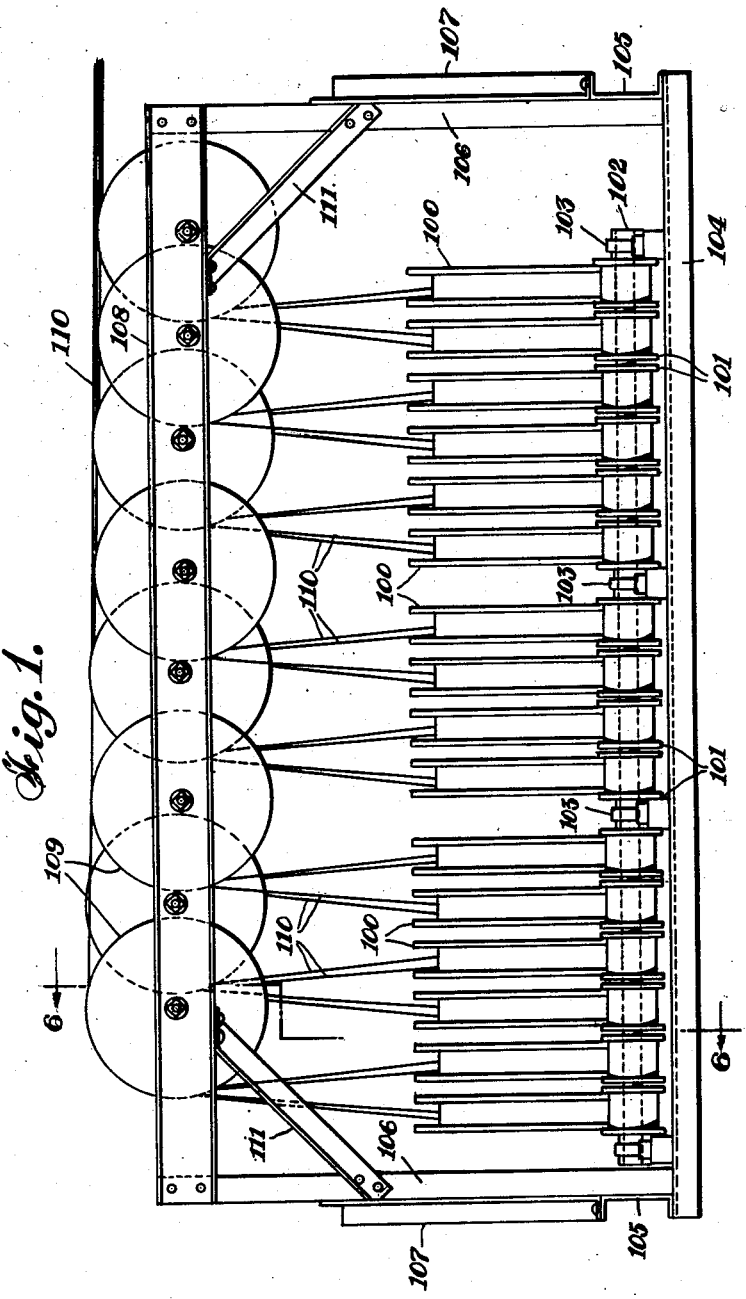

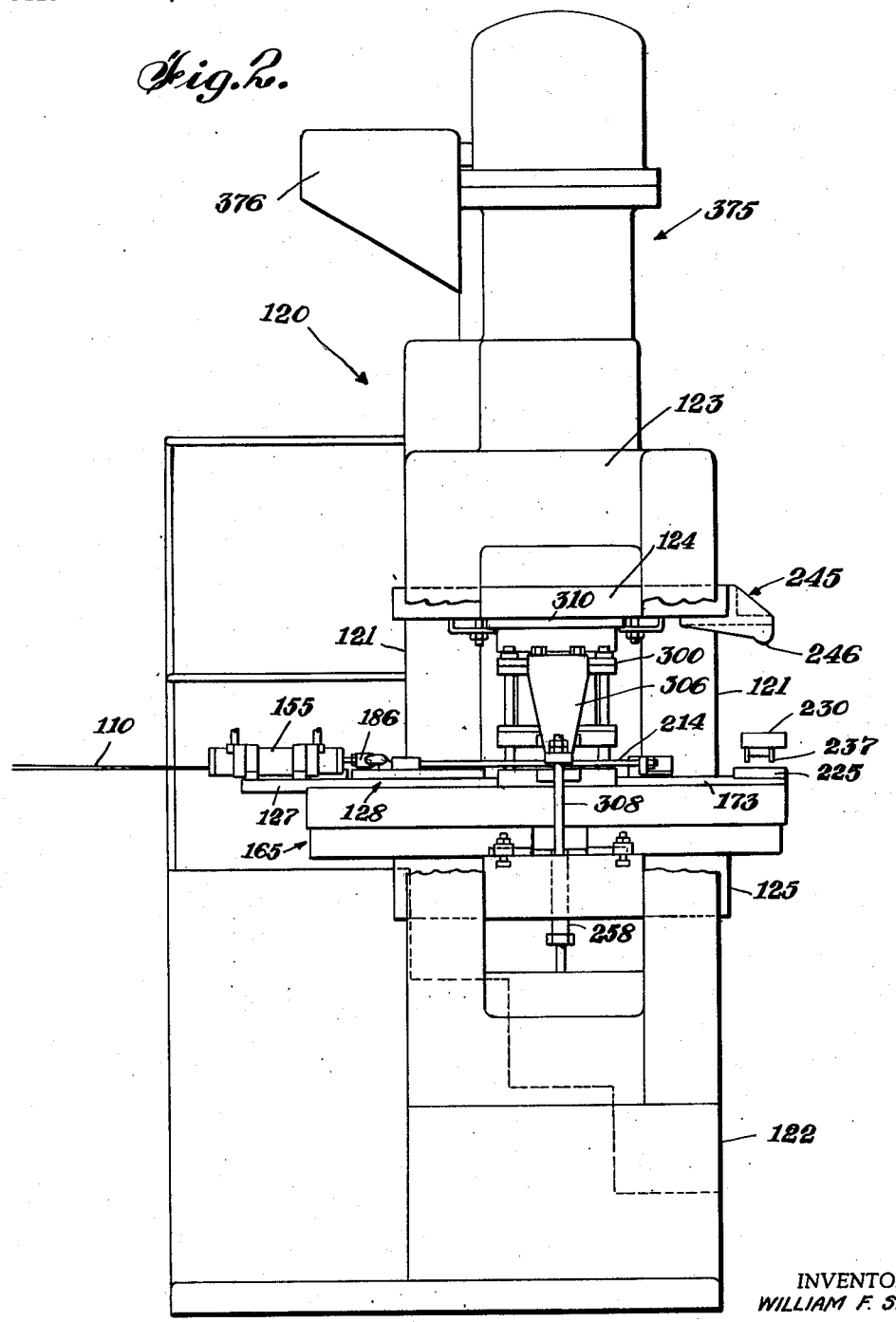

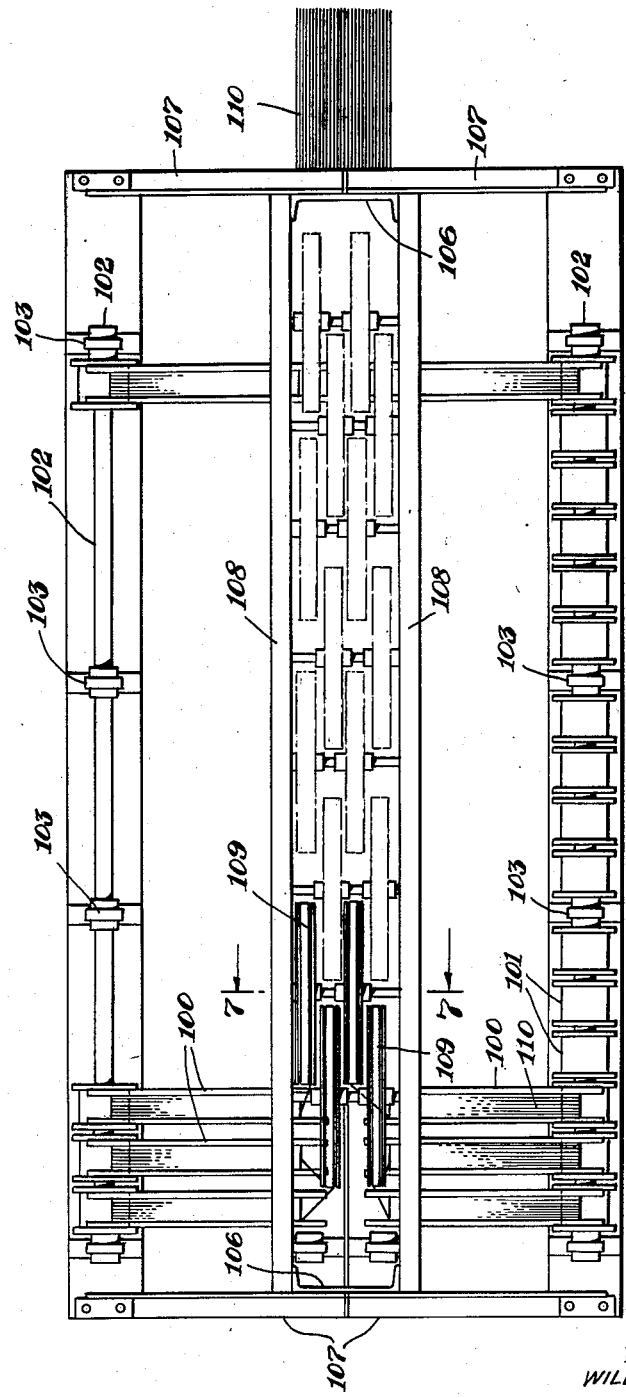

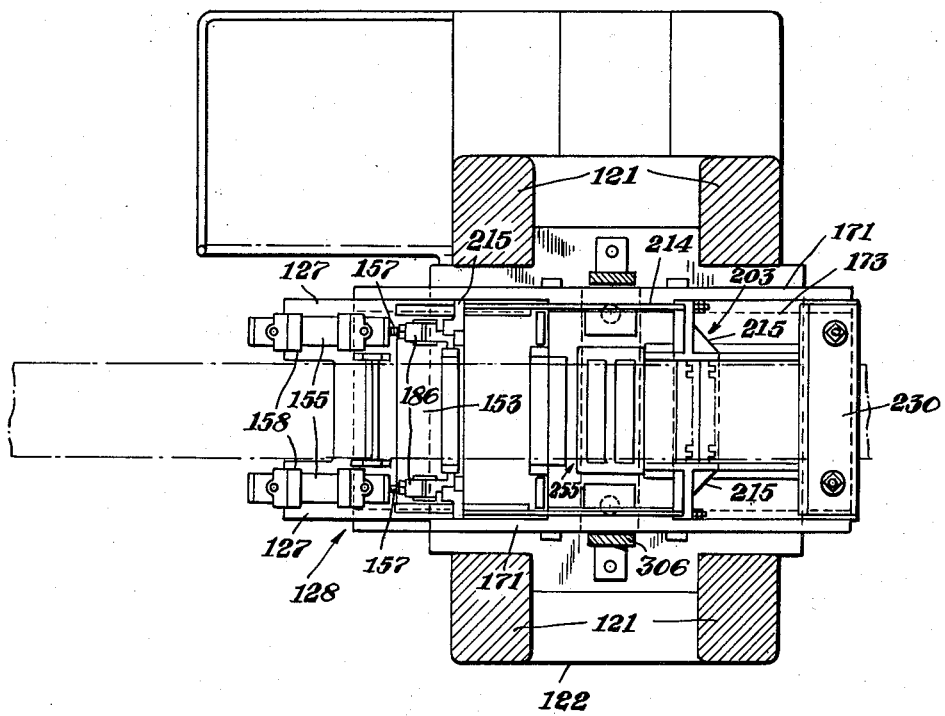

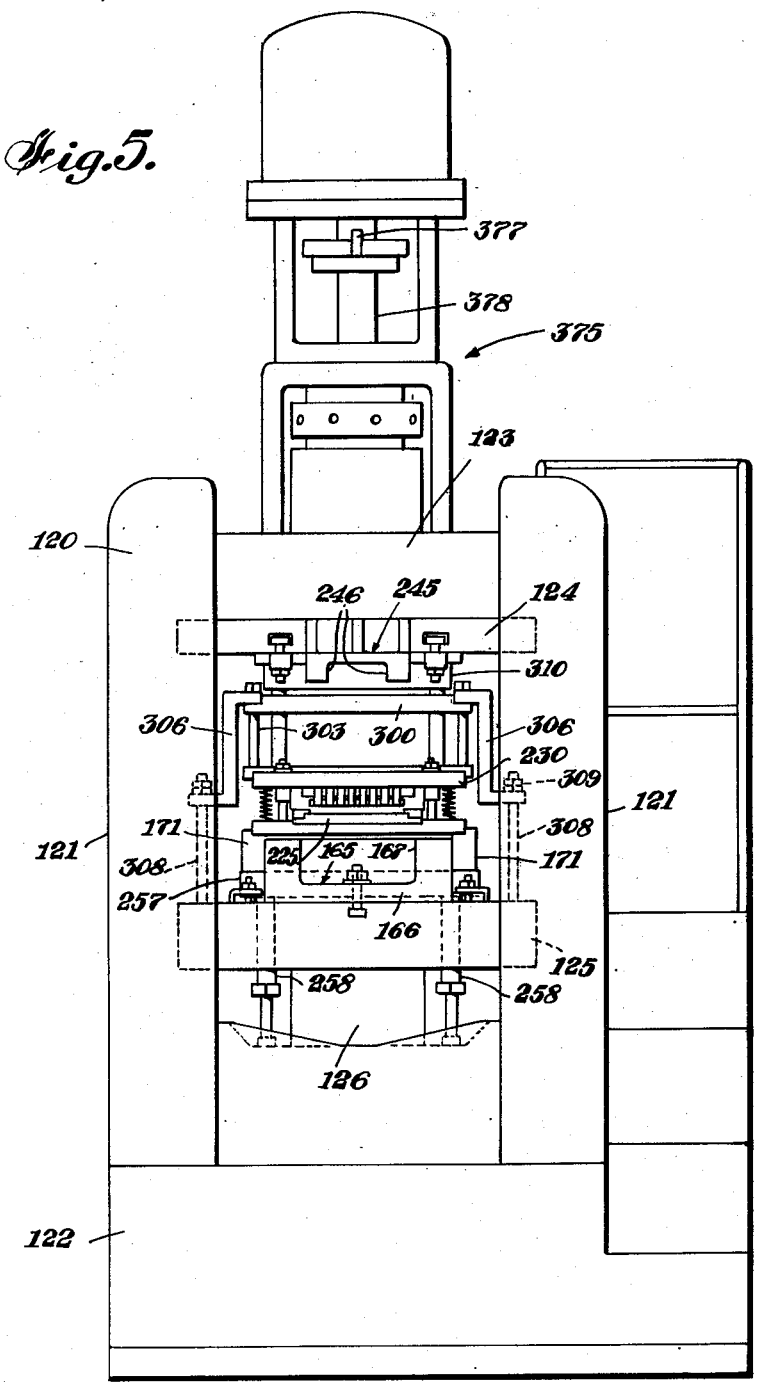

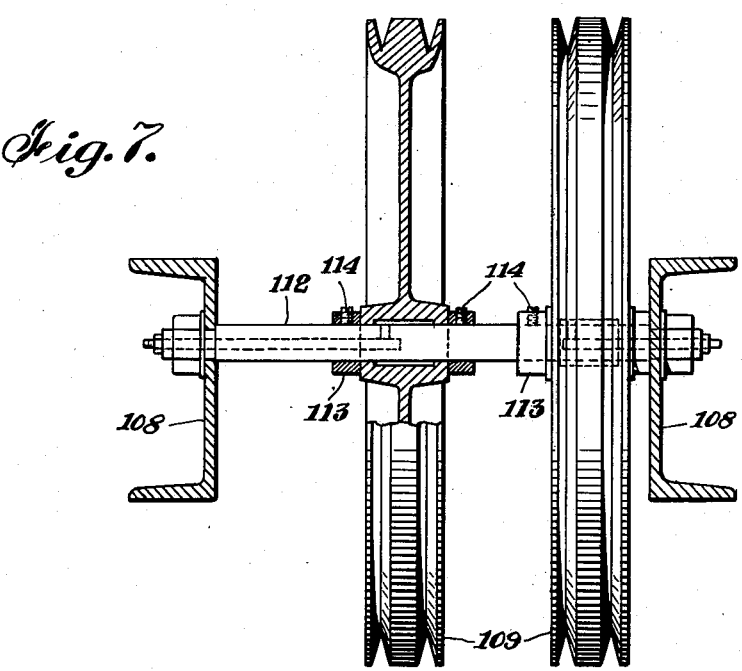
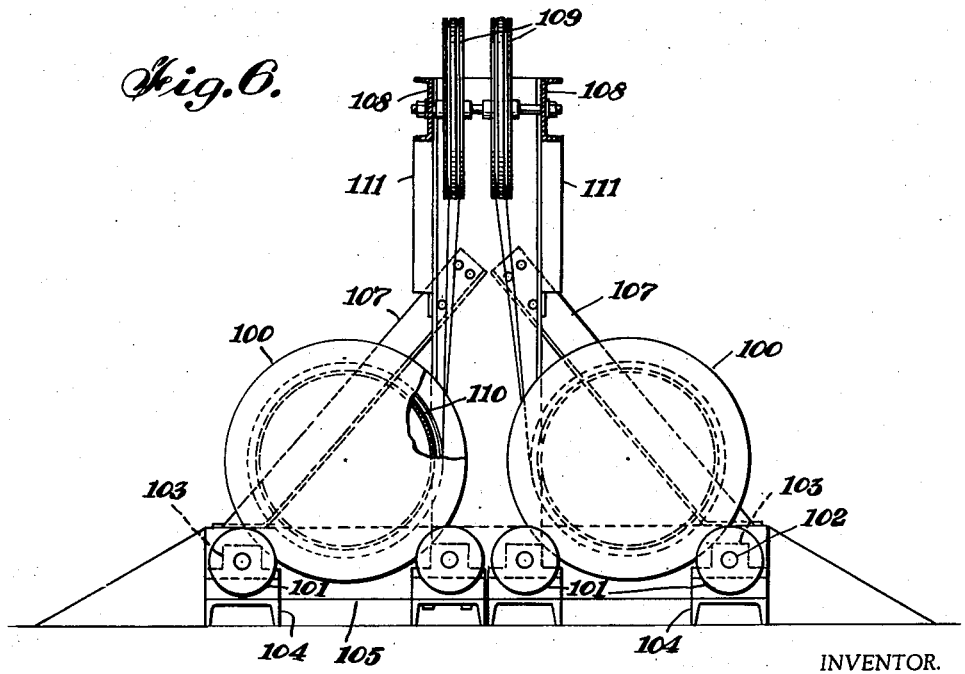

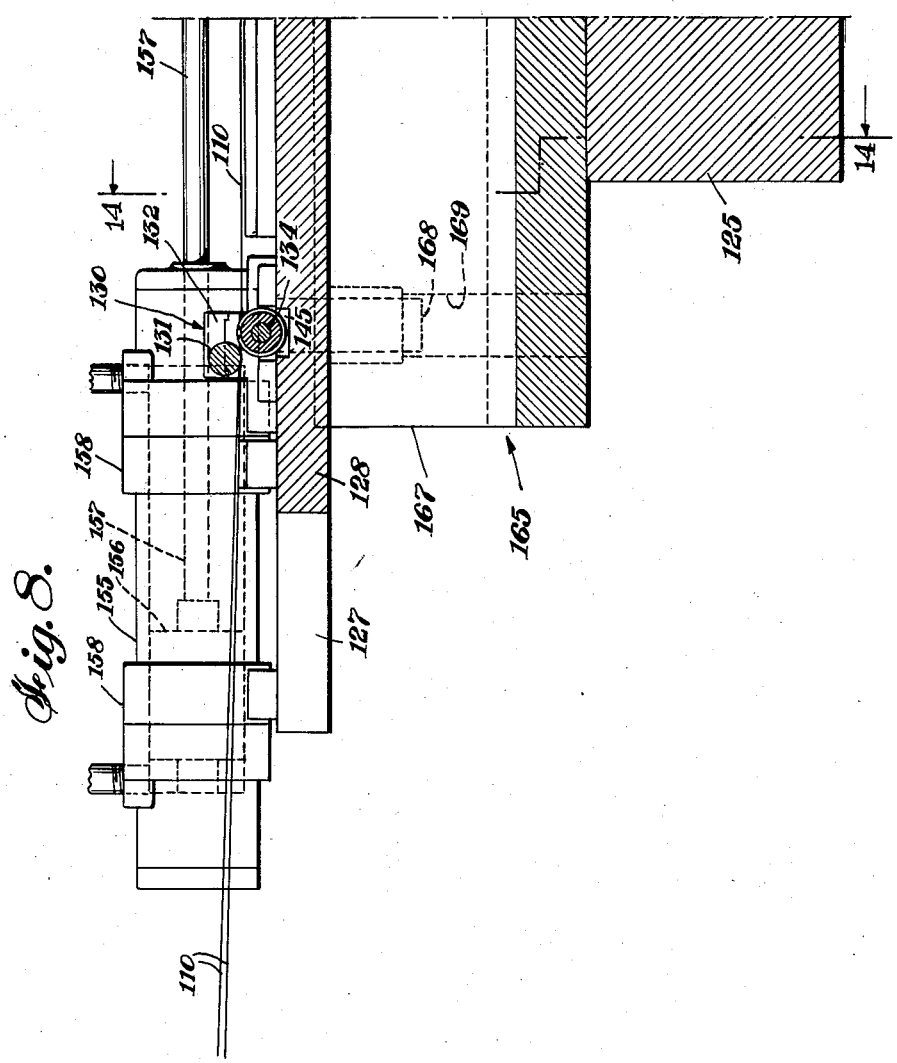

BY Robert T. Harding Jr.

ATTORNEYS

Sept. 25, 1951  W. F. SMITH  2,568,771
BANK STRIP MOLDING MACHINE
Filed Feb. 26, 1947  36 Sheets-Sheet 11

INVENTOR.
WILLIAM F. SMITH

BY Robert Harding Jr.
ATTORNEYS

Sept. 25, 1951 W. F. SMITH 2,568,771
BANK STRIP MOLDING MACHINE
Filed Feb. 26, 1947 36 Sheets-Sheet 12
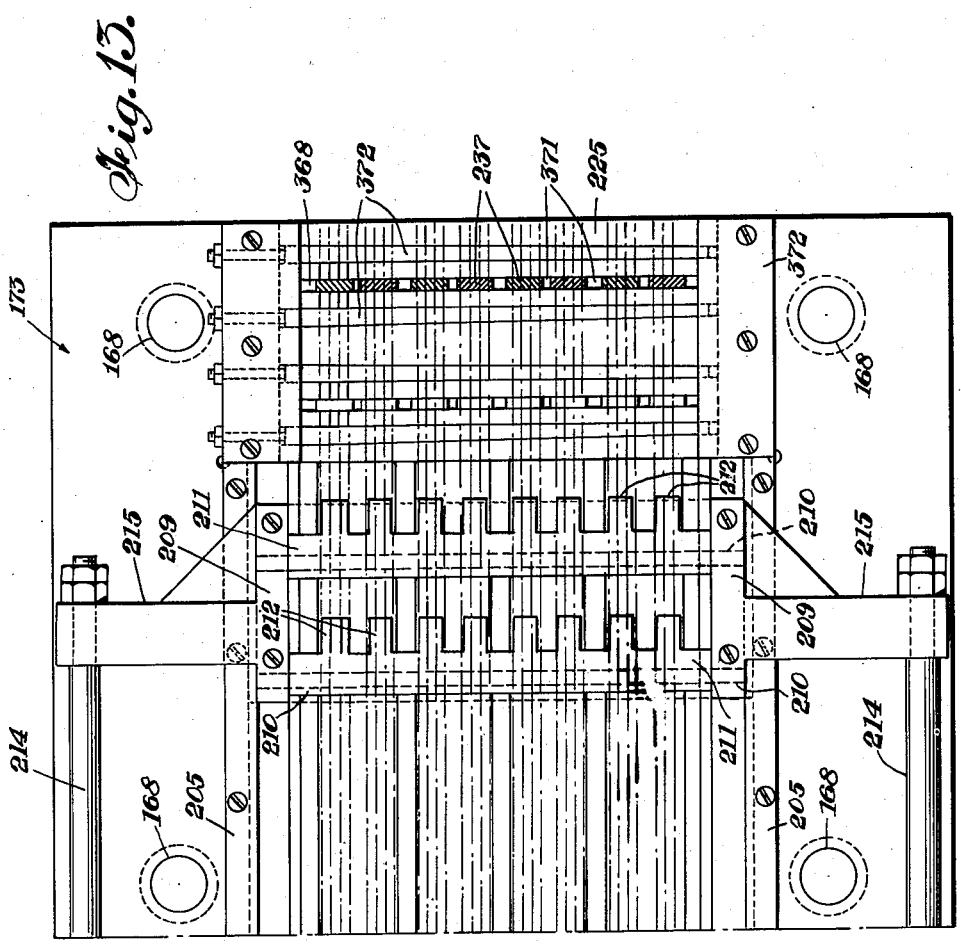
INVENTOR.
WILLIAM F. SMITH
BY
ATTORNEYS

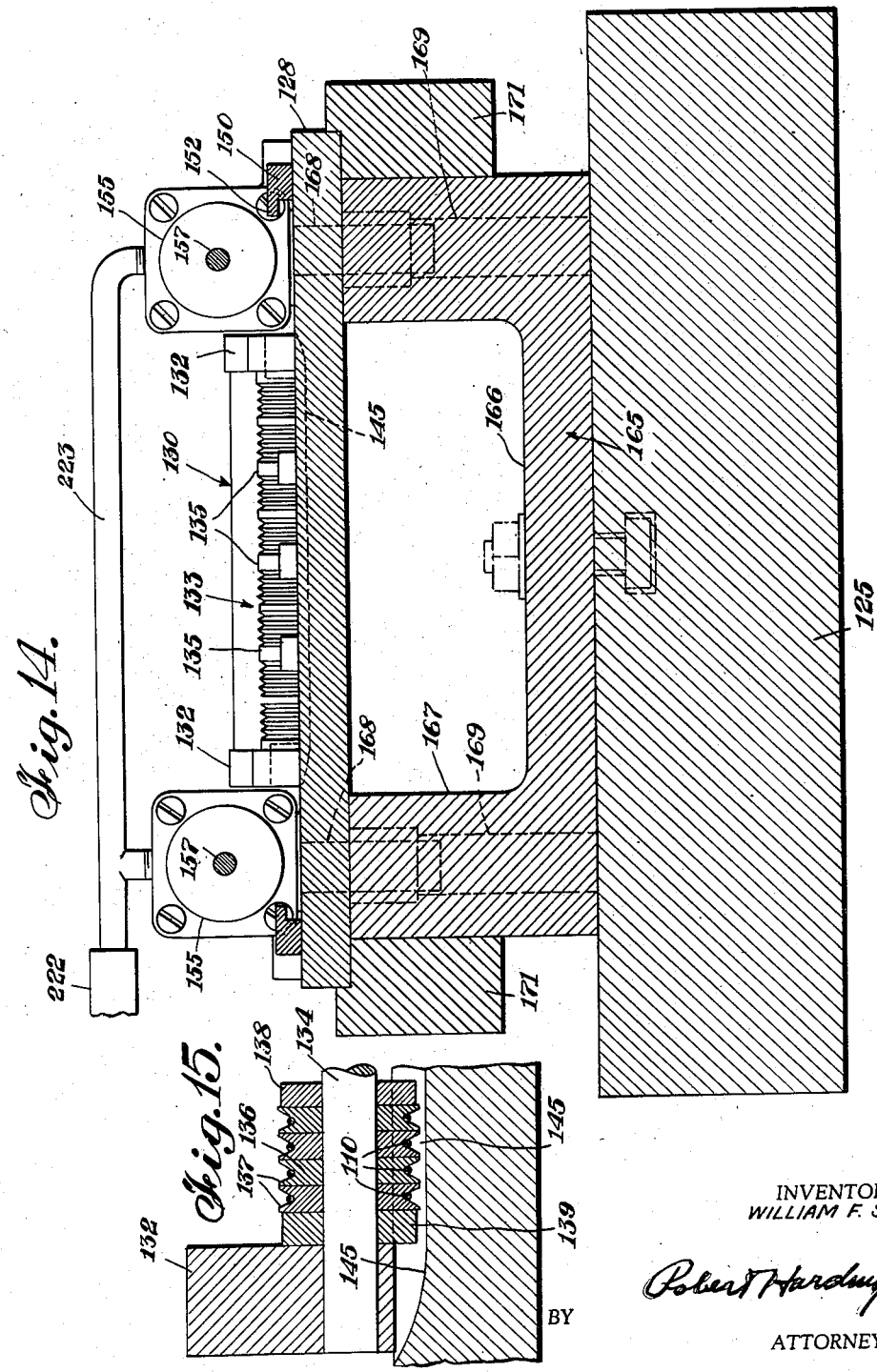

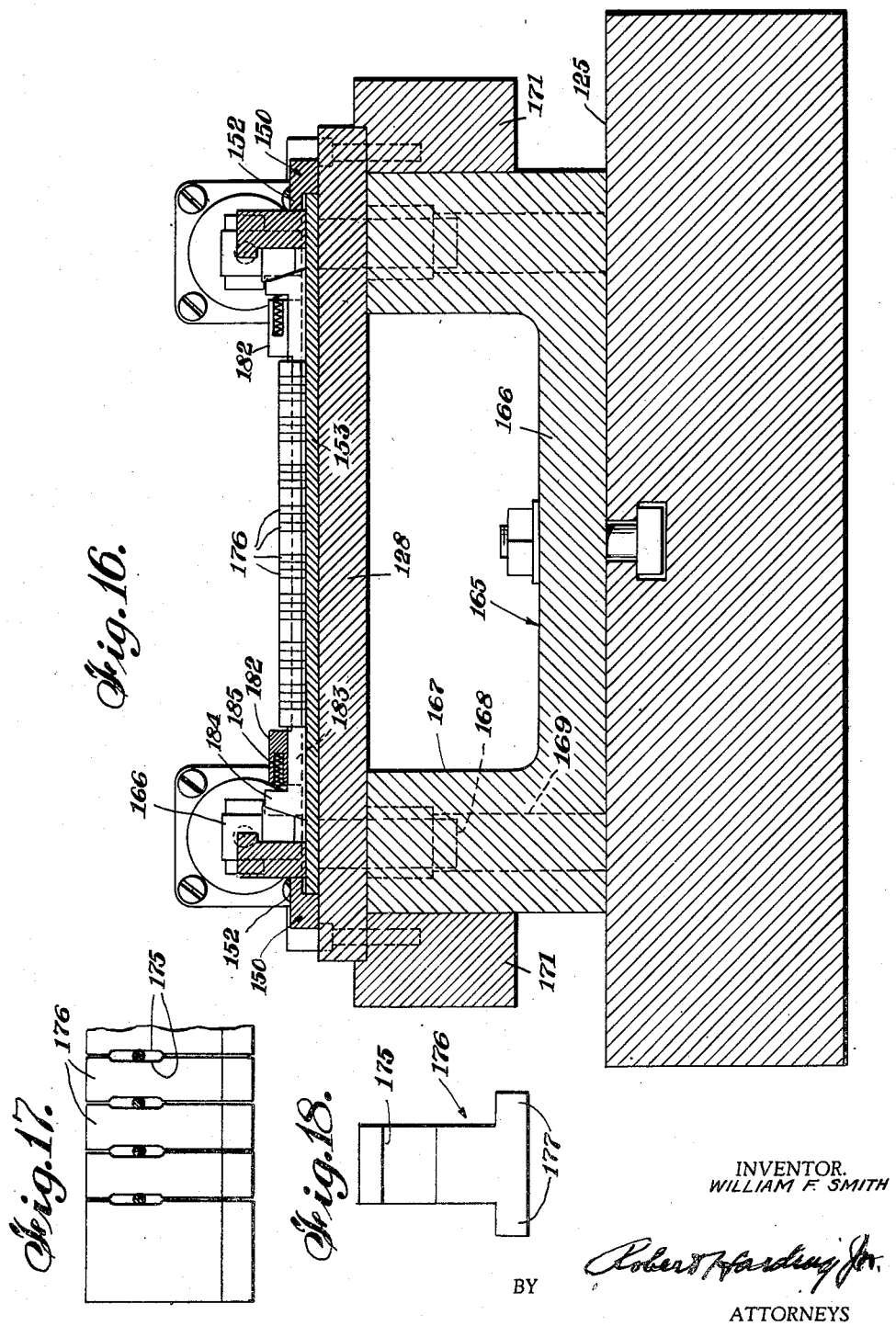

Sept. 25, 1951 W. F. SMITH 2,568,771
BANK STRIP MOLDING MACHINE
Filed Feb. 26, 1947 36 Sheets-Sheet 15
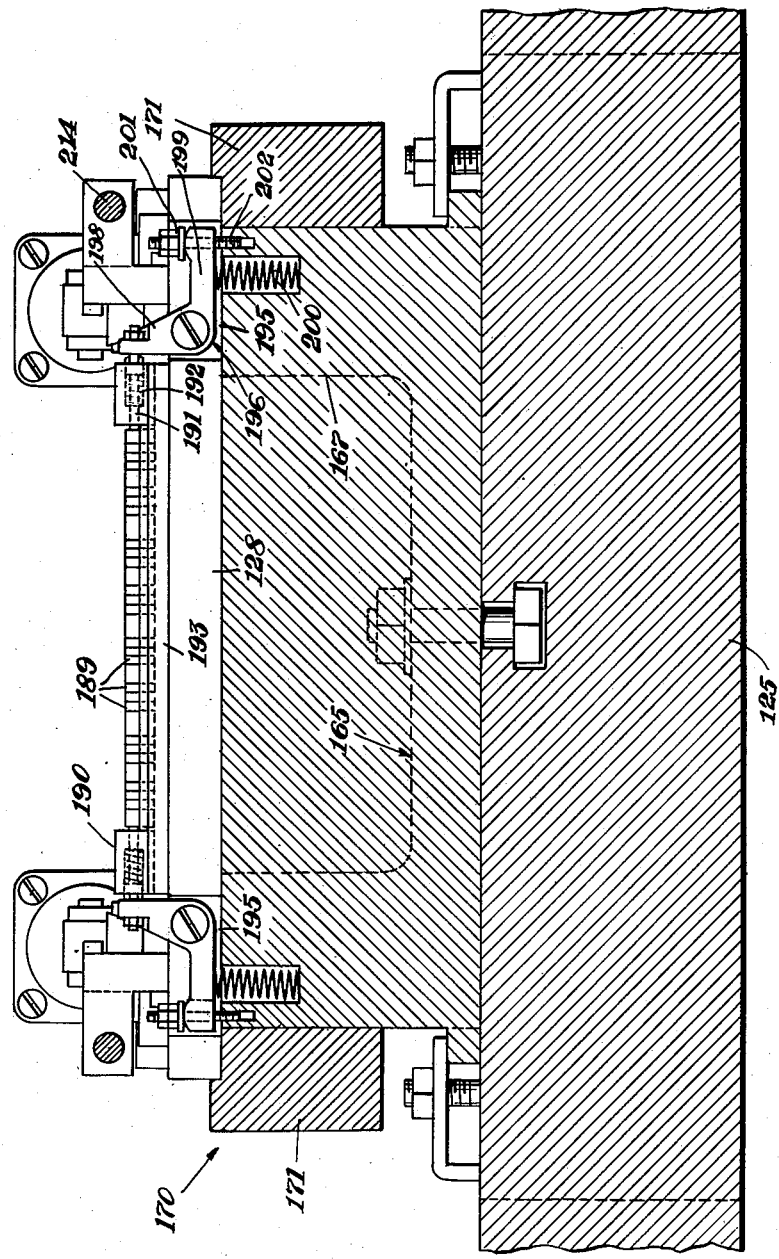
INVENTOR.
WILLIAM F. SMITH
BY
ATTORNEYS

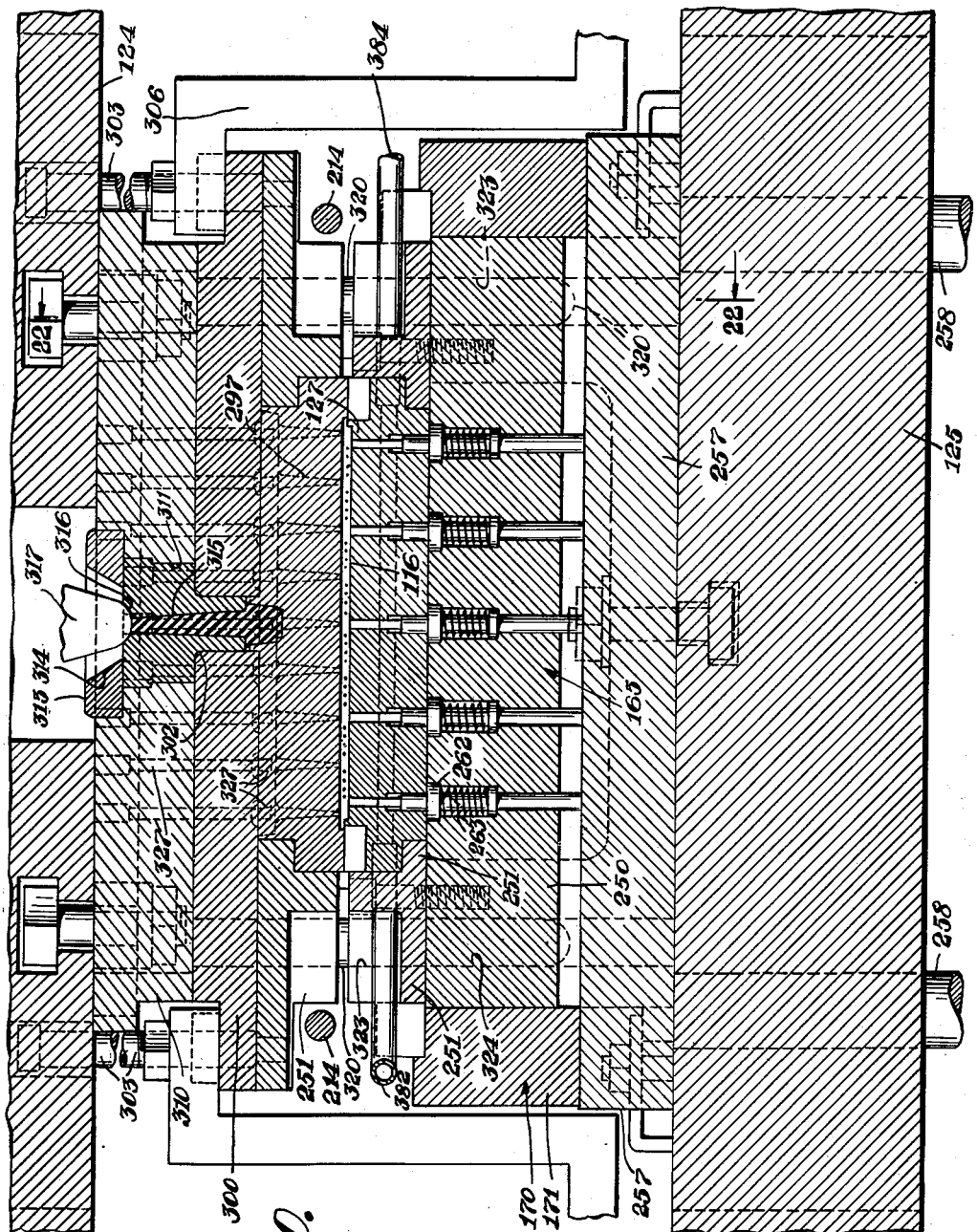

Sept. 25, 1951 W. F. SMITH 2,568,771
BANK STRIP MOLDING MACHINE
Filed Feb. 26, 1947 36 Sheets-Sheet 17

INVENTOR.
WILLIAM F. SMITH

BY Robert Harding Jr.
ATTORNEYS

Sept. 25, 1951 W. F. SMITH 2,568,771
BANK STRIP MOLDING MACHINE
Filed Feb. 26, 1947 36 Sheets-Sheet 18
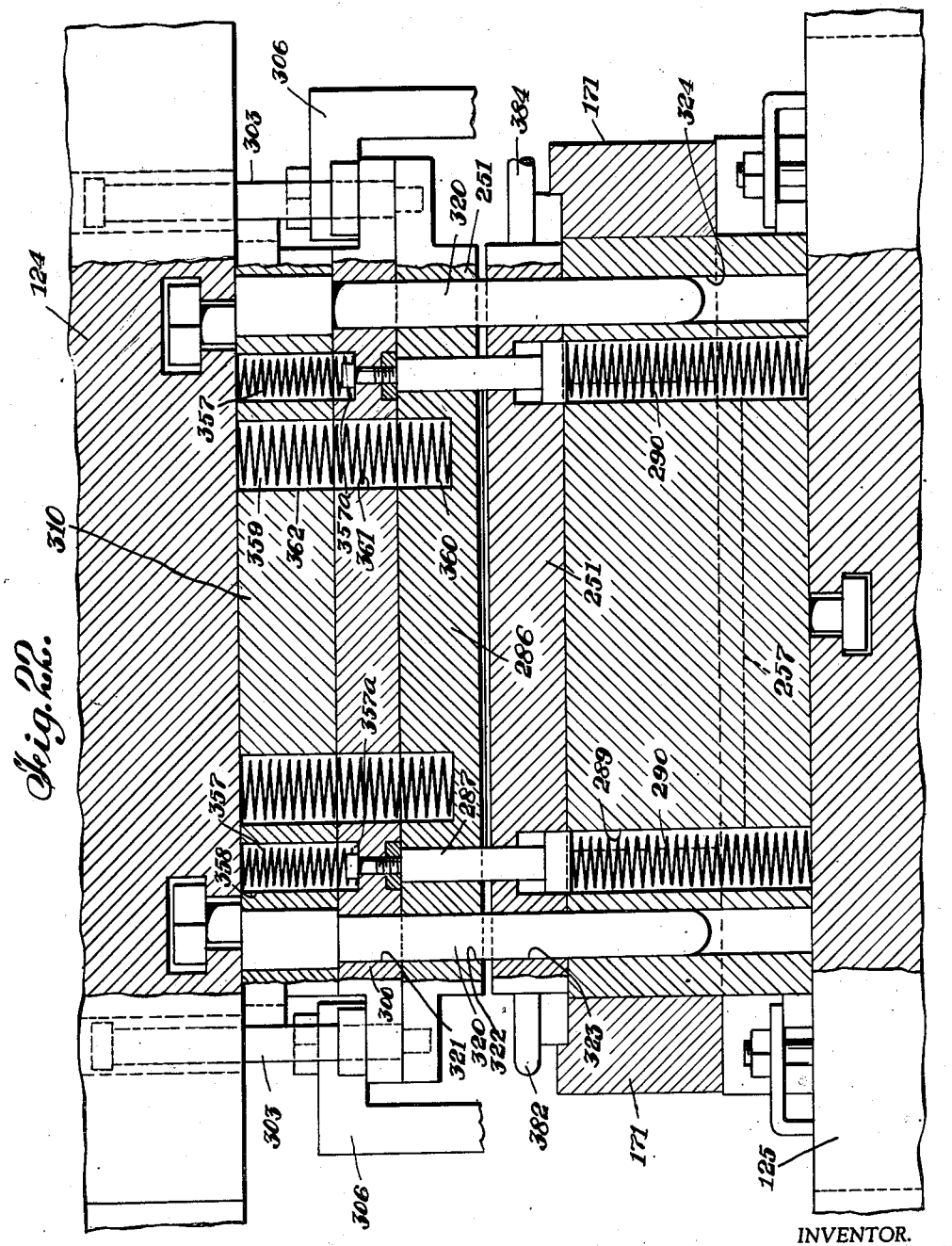
INVENTOR.
WILLIAM F. SMITH
BY *Robert Harding Jr.*
ATTORNEYS Sept. 25, 1951 W. F. SMITH 2,568,771
BANK STRIP MOLDING MACHINE
Filed Feb. 26, 1947 36 Sheets-Sheet 19
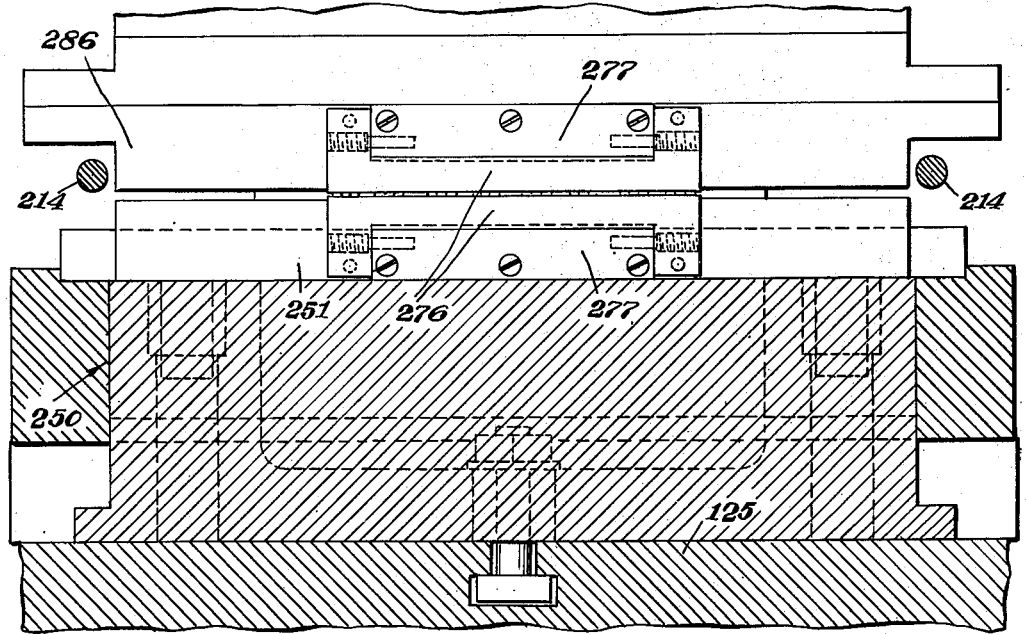
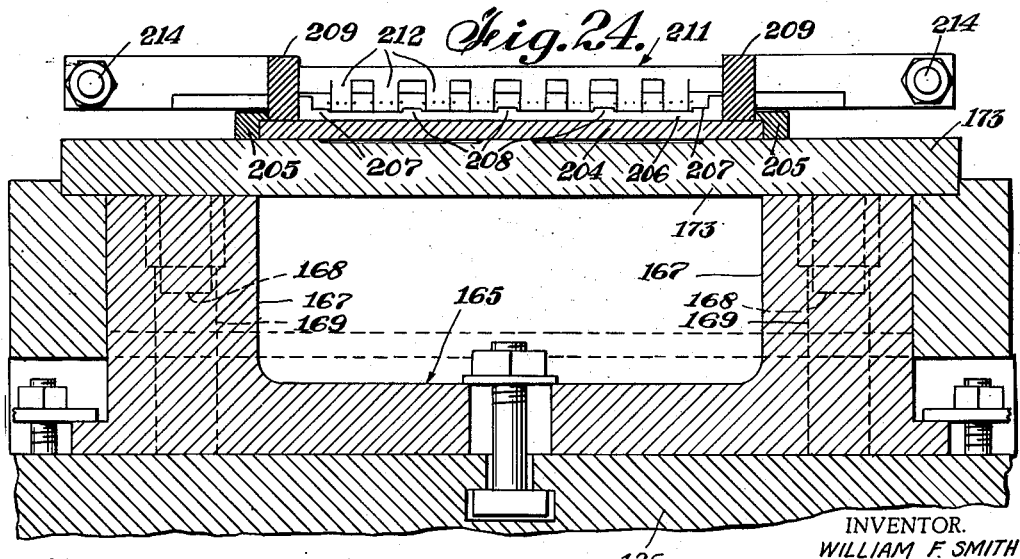
INVENTOR.
WILLIAM F. SMITH
BY Robert Harding Jr.
ATTORNEYS

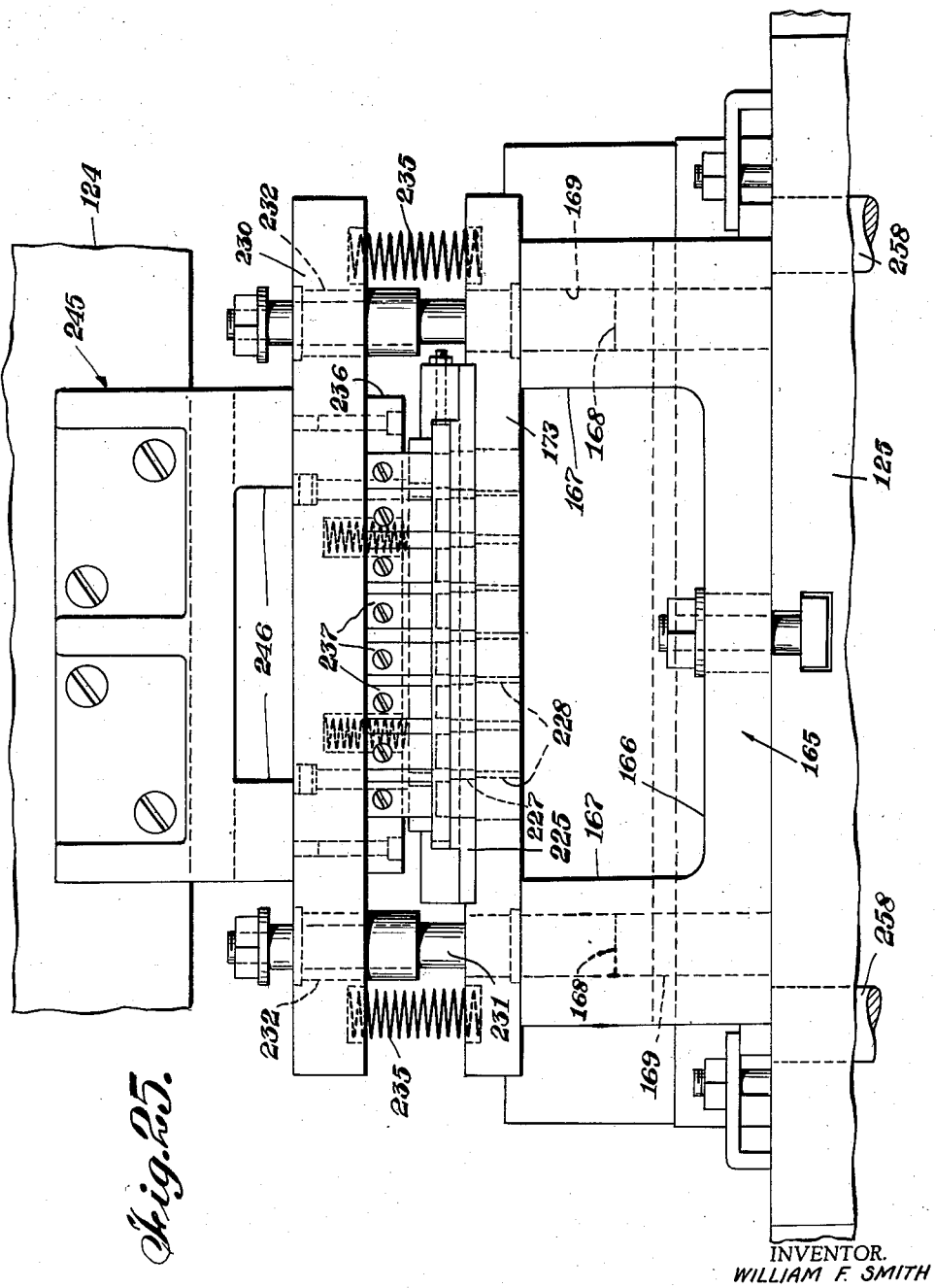

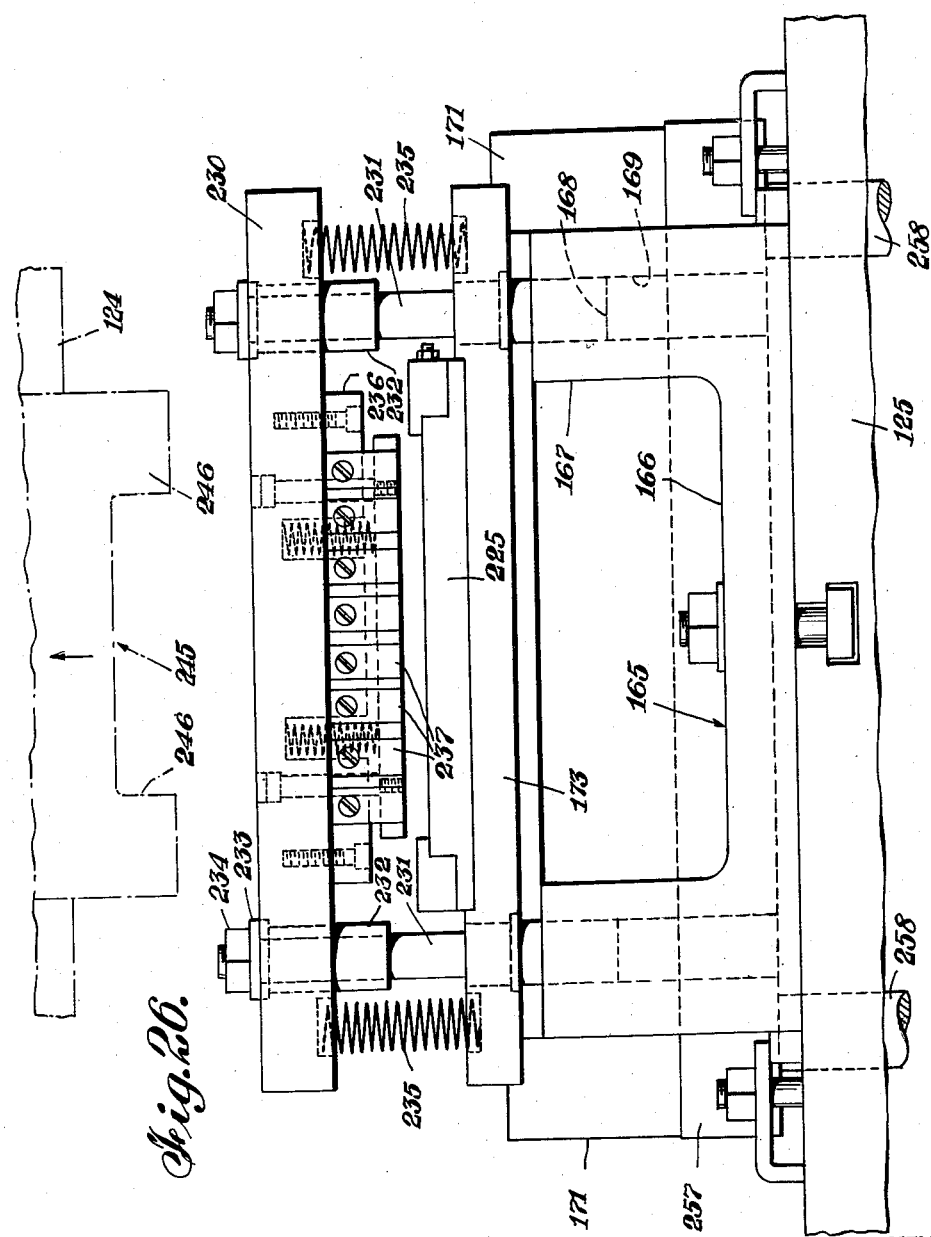

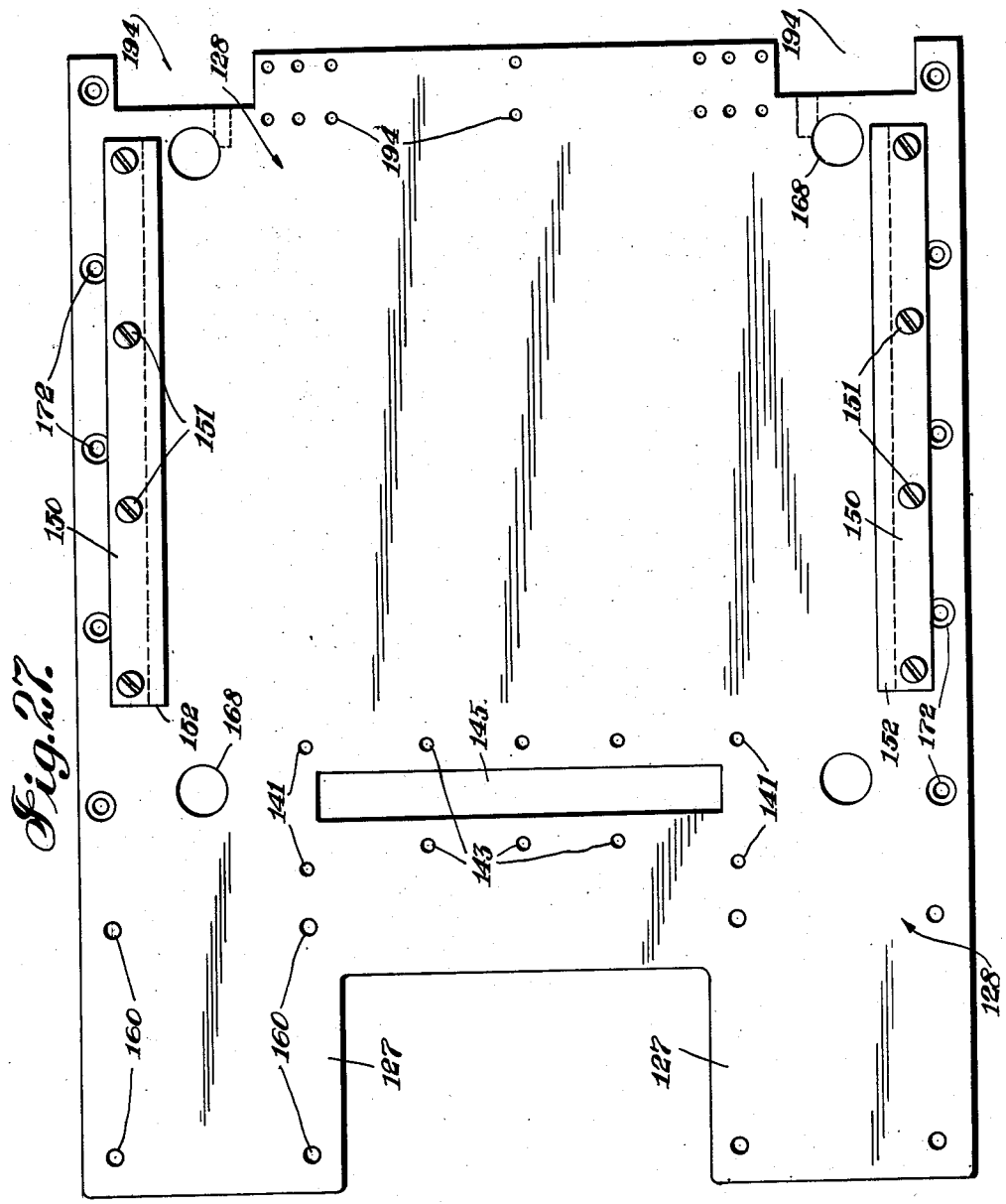

Sept. 25, 1951 W. F. SMITH 2,568,771
BANK STRIP MOLDING MACHINE
Filed Feb. 26, 1947 36 Sheets-Sheet 23
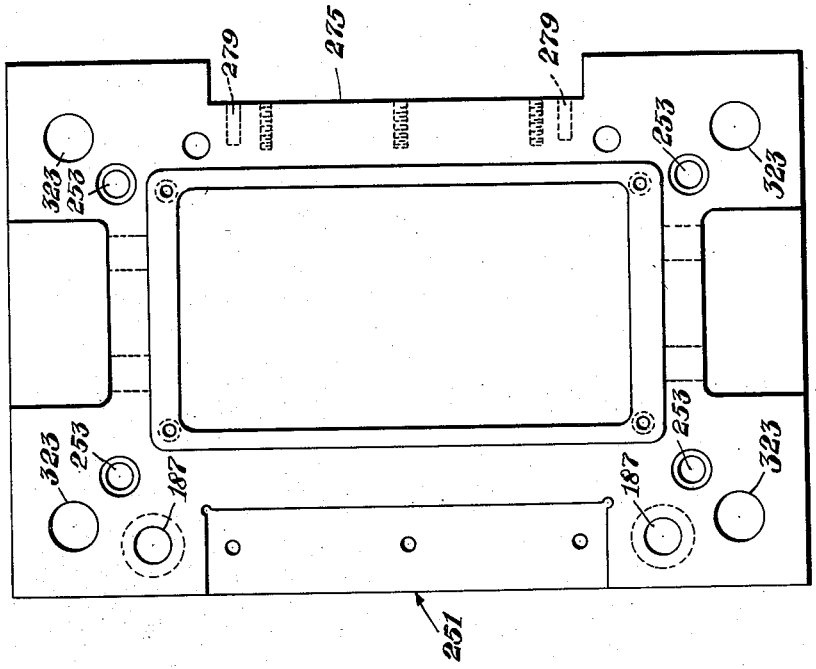
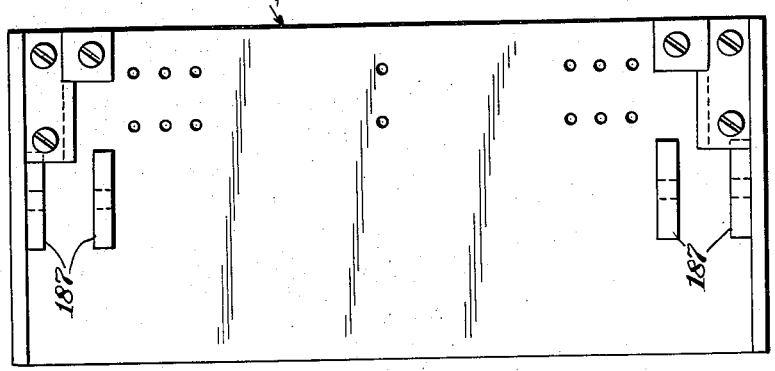
INVENTOR.
WILLIAM F. SMITH
BY *Robert Harding J.*
ATTORNEYS Sept. 25, 1951 W. F. SMITH 2,568,771
BANK STRIP MOLDING MACHINE
Filed Feb. 26, 1947 36 Sheets-Sheet 24
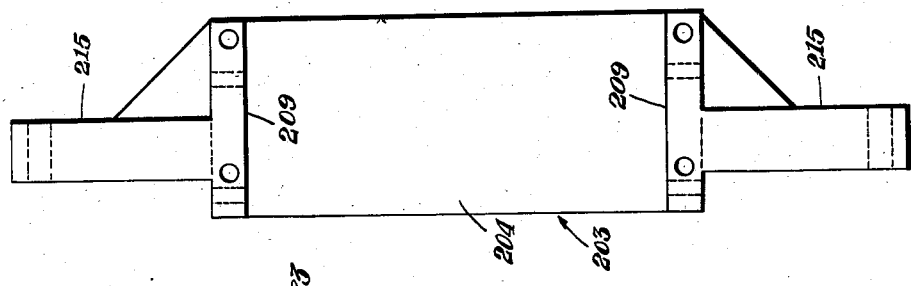
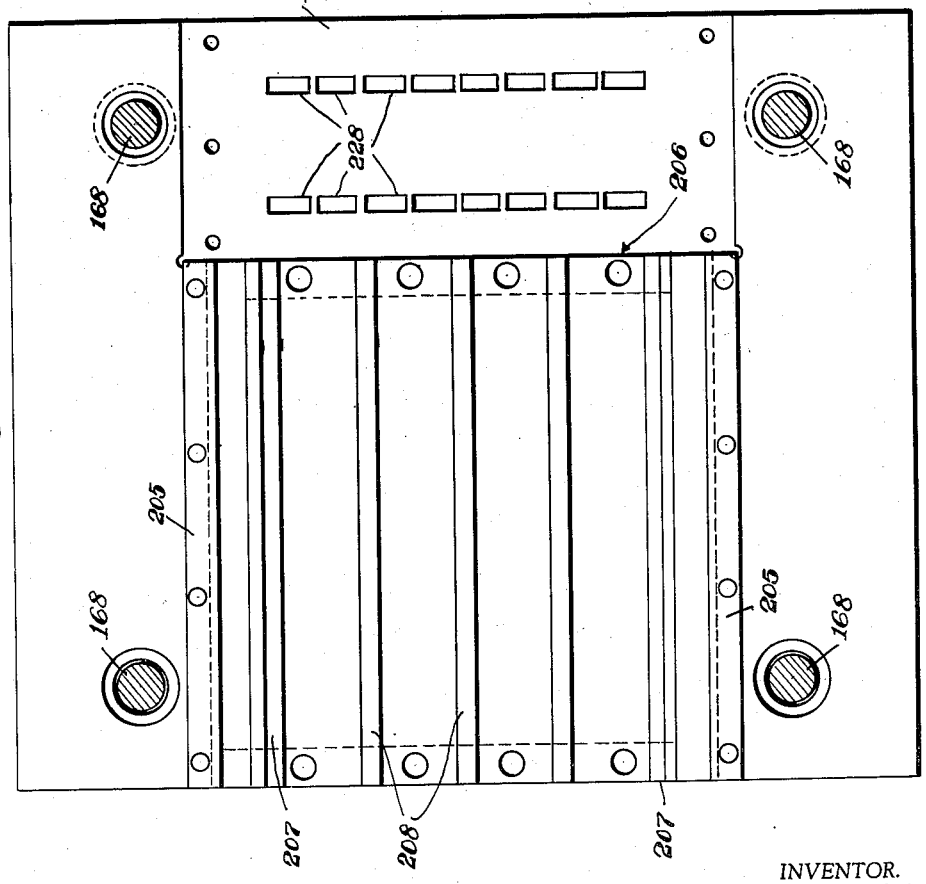
INVENTOR.
WILLIAM F. SMITH
BY
ATTORNEYS Sept. 25, 1951  W. F. SMITH  2,568,771
BANK STRIP MOLDING MACHINE
Filed Feb. 26, 1947  36 Sheets-Sheet 25
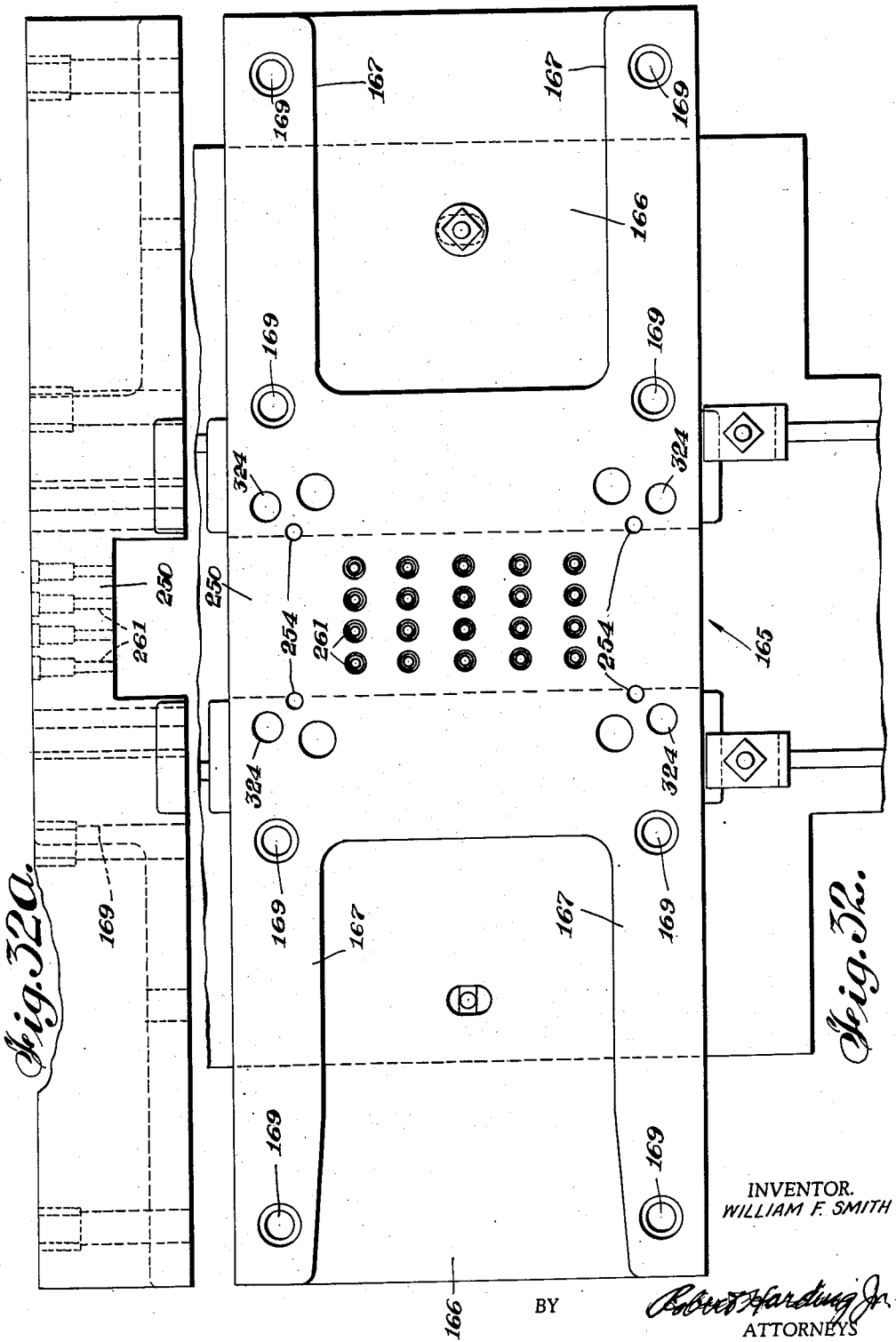
INVENTOR.
WILLIAM F. SMITH
BY Robert Harding Jr.
ATTORNEYS

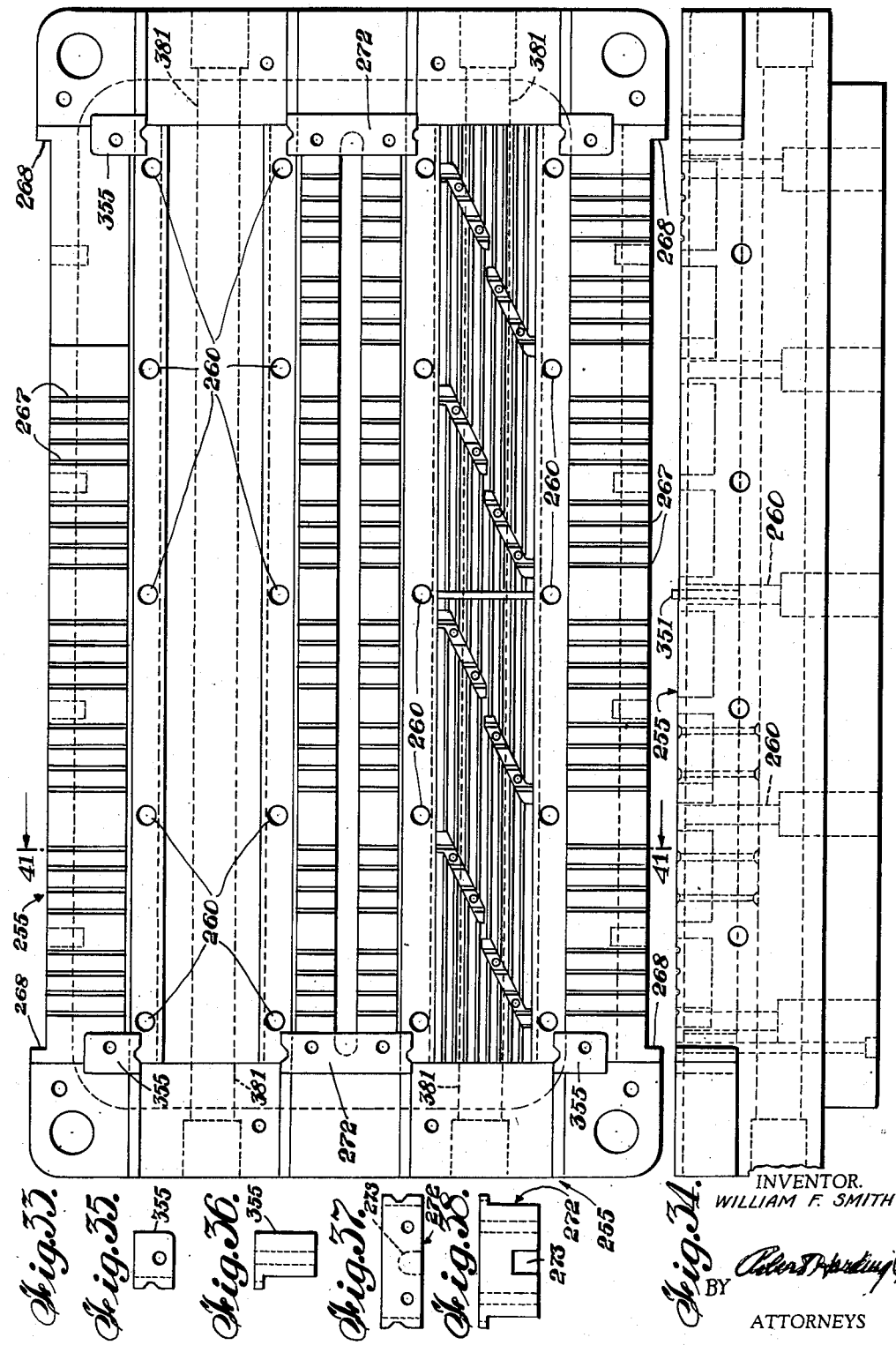

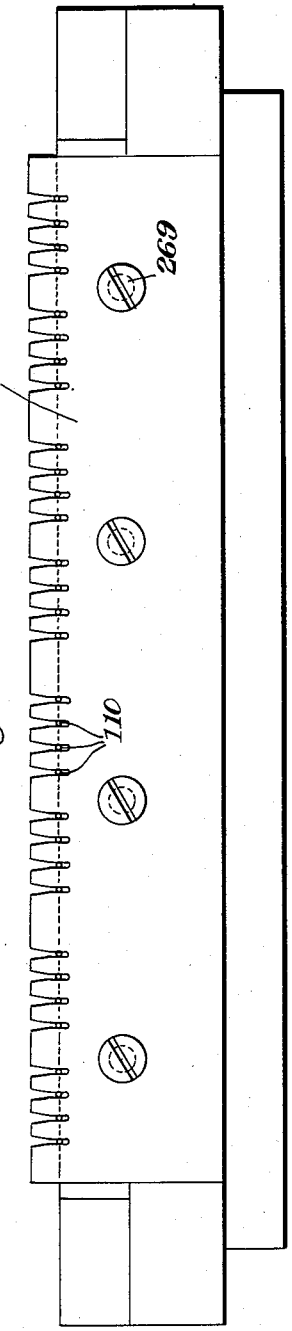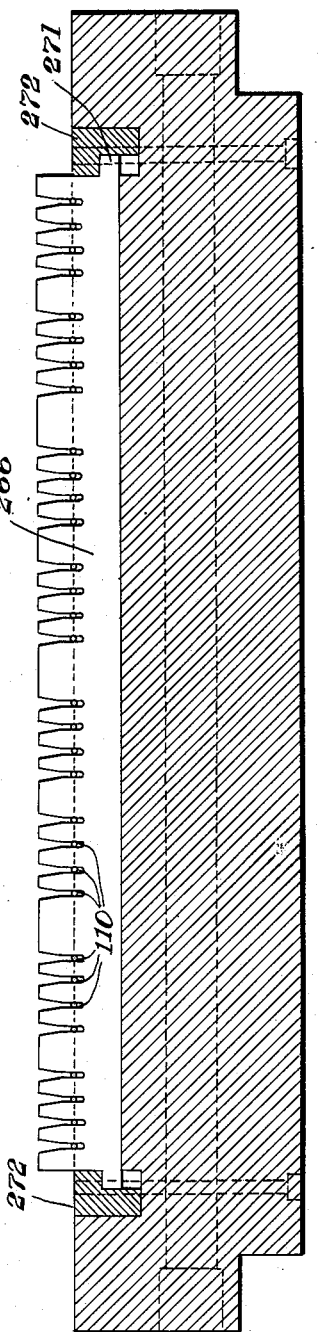

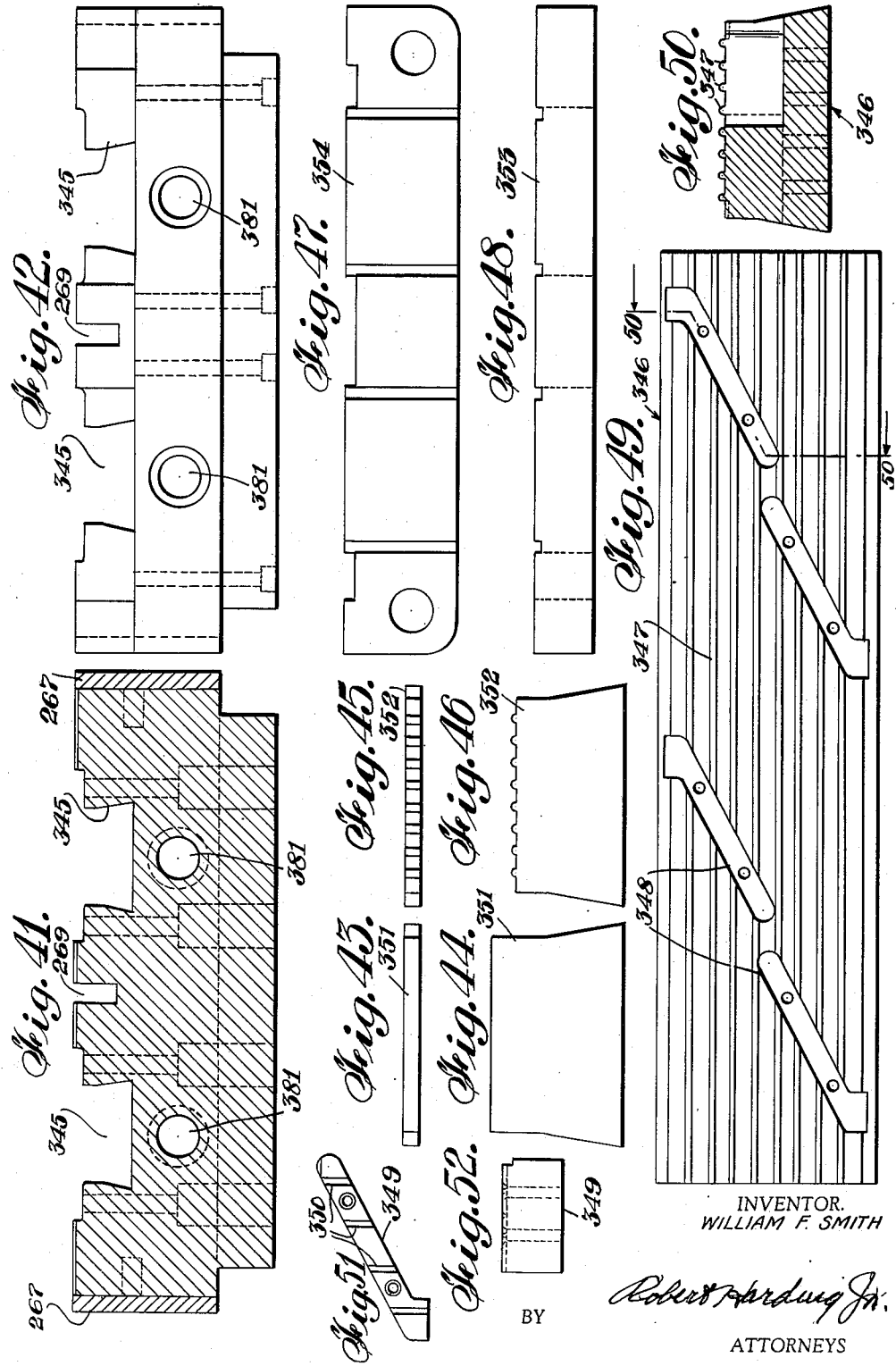

Sept. 25, 1951  W. F. SMITH  2,568,771
BANK STRIP MOLDING MACHINE
Filed Feb. 26, 1947  36 Sheets-Sheet 29
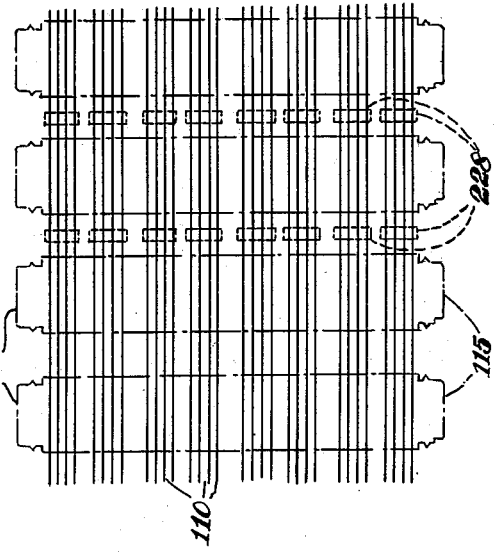
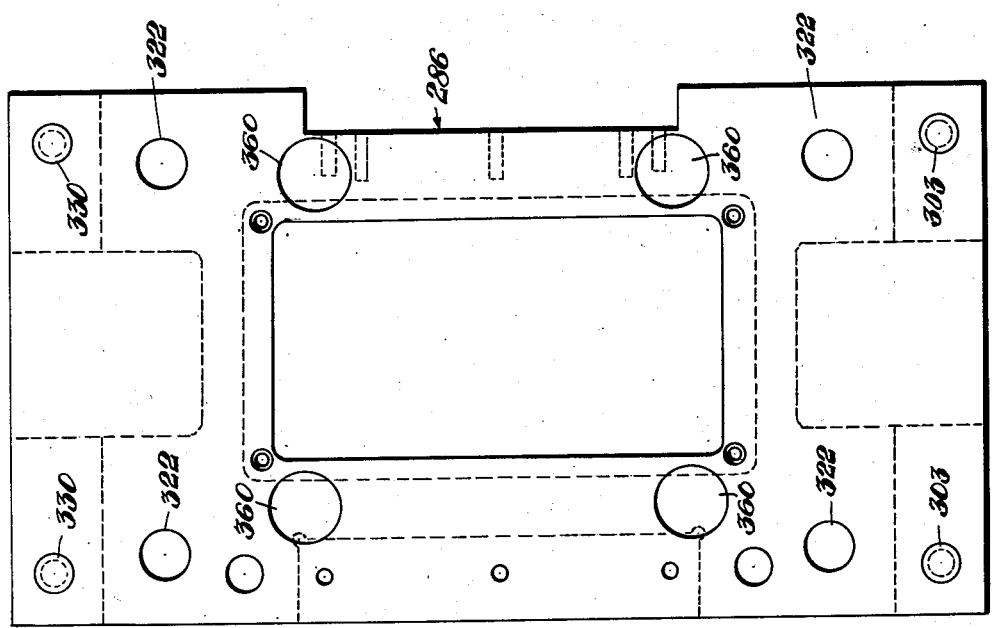
INVENTOR.
WILLIAM F. SMITH
BY *Robert Hardwig Jr.*
ATTORNEYS Sept. 25, 1951 W. F. SMITH 2,568,771
BANK STRIP MOLDING MACHINE
Filed Feb. 26, 1947 36 Sheets-Sheet 30
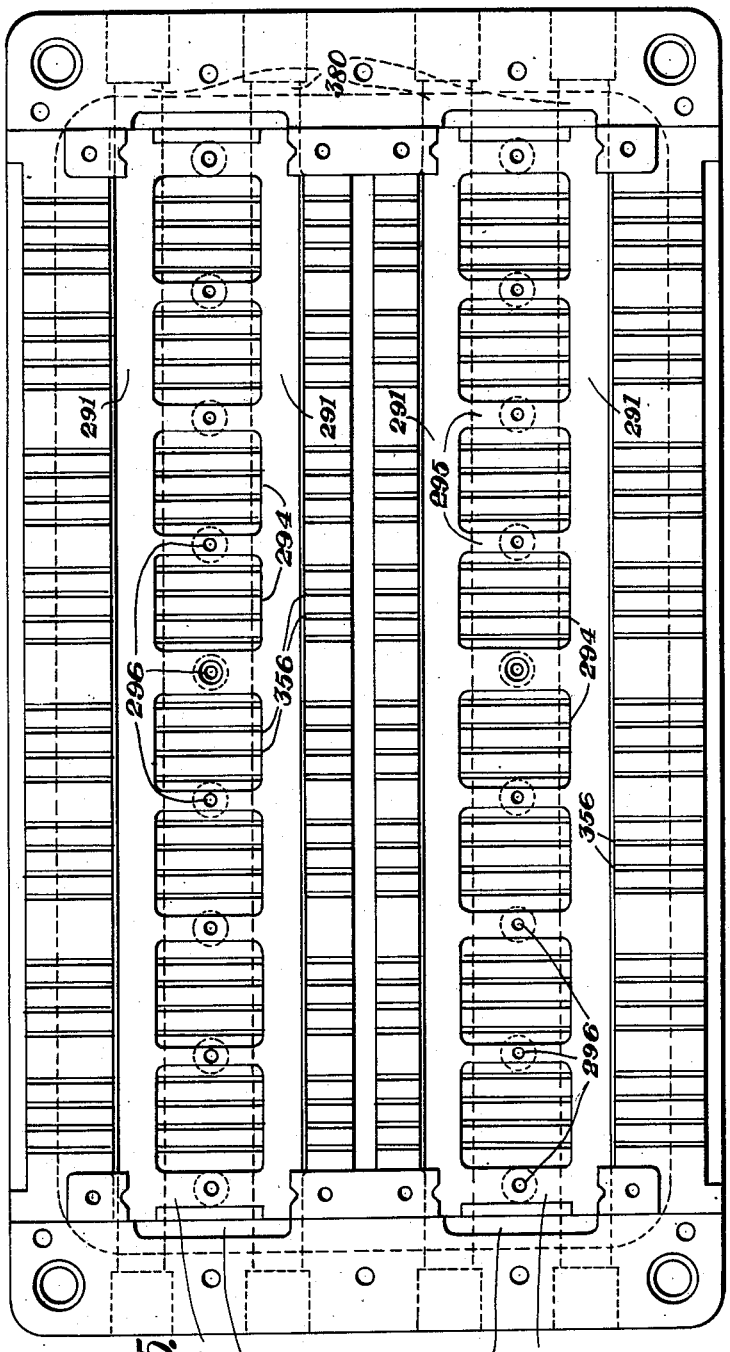
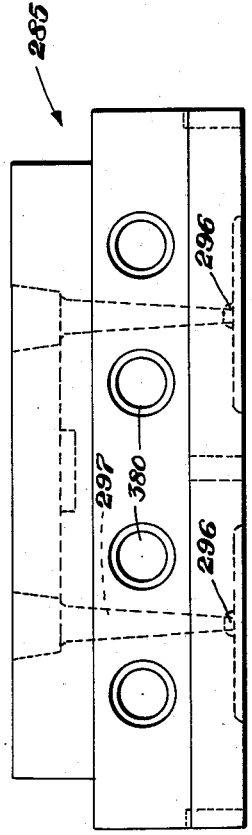
INVENTOR.
WILLIAM F. SMITH
BY
ATTORNEYS Sept. 25, 1951 W. F. SMITH 2,568,771
BANK STRIP MOLDING MACHINE
Filed Feb. 26, 1947 36 Sheets-Sheet 31
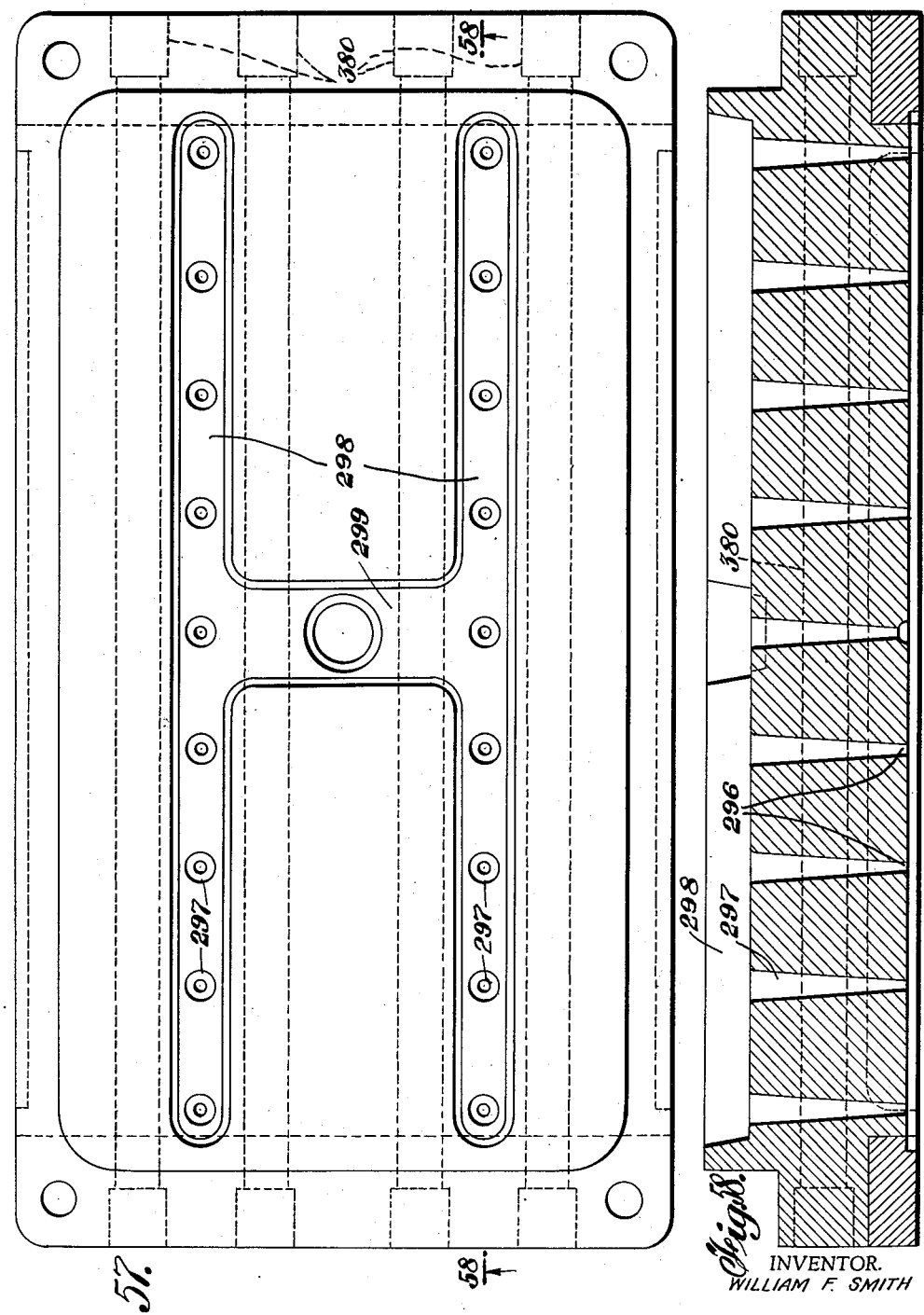
INVENTOR.
WILLIAM F. SMITH Sept. 25, 1951 W. F. SMITH 2,568,771
BANK STRIP MOLDING MACHINE
Filed Feb. 26, 1947 36 Sheets-Sheet 32
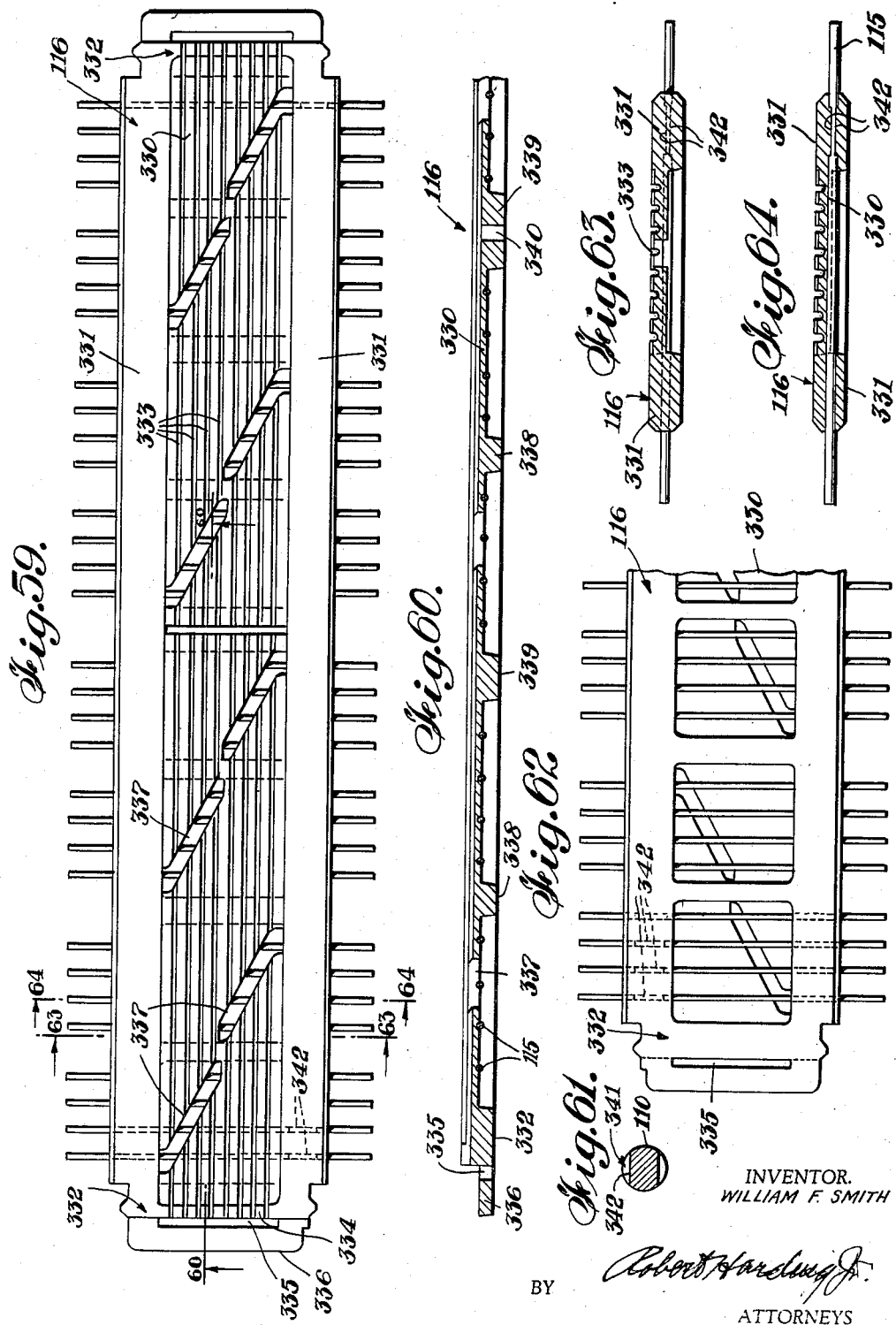
INVENTOR.
WILLIAM F. SMITH
BY
ATTORNEYS

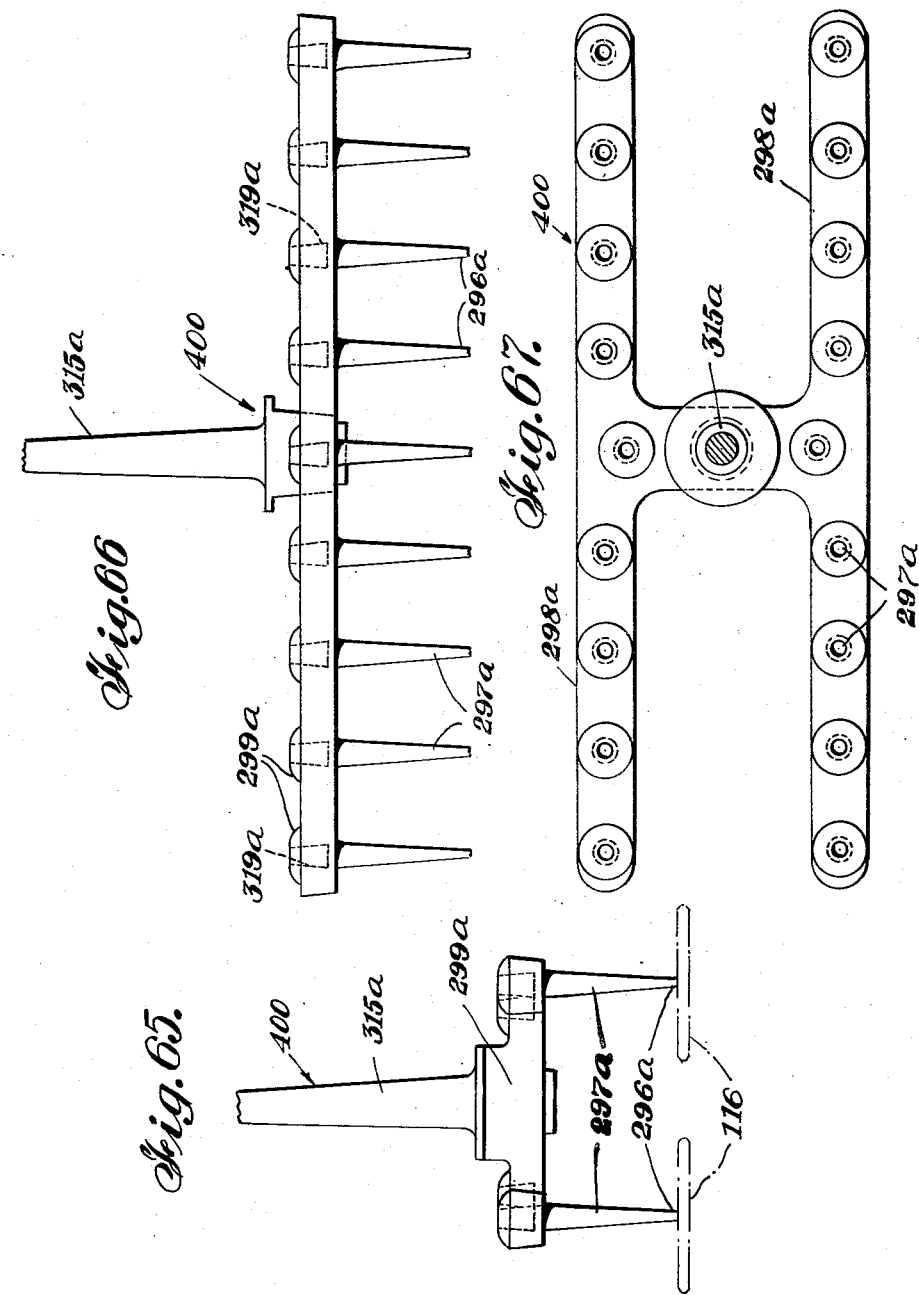

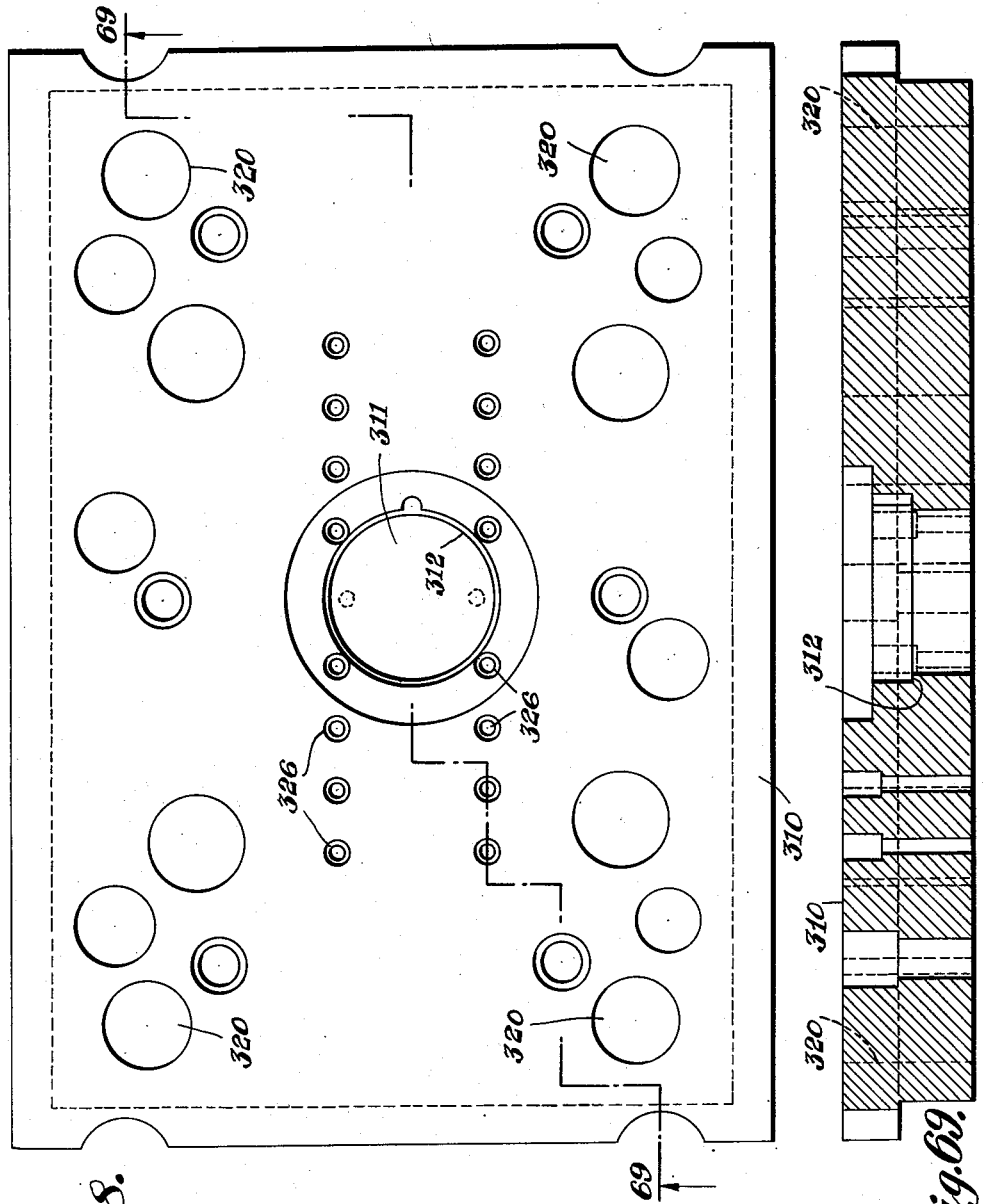

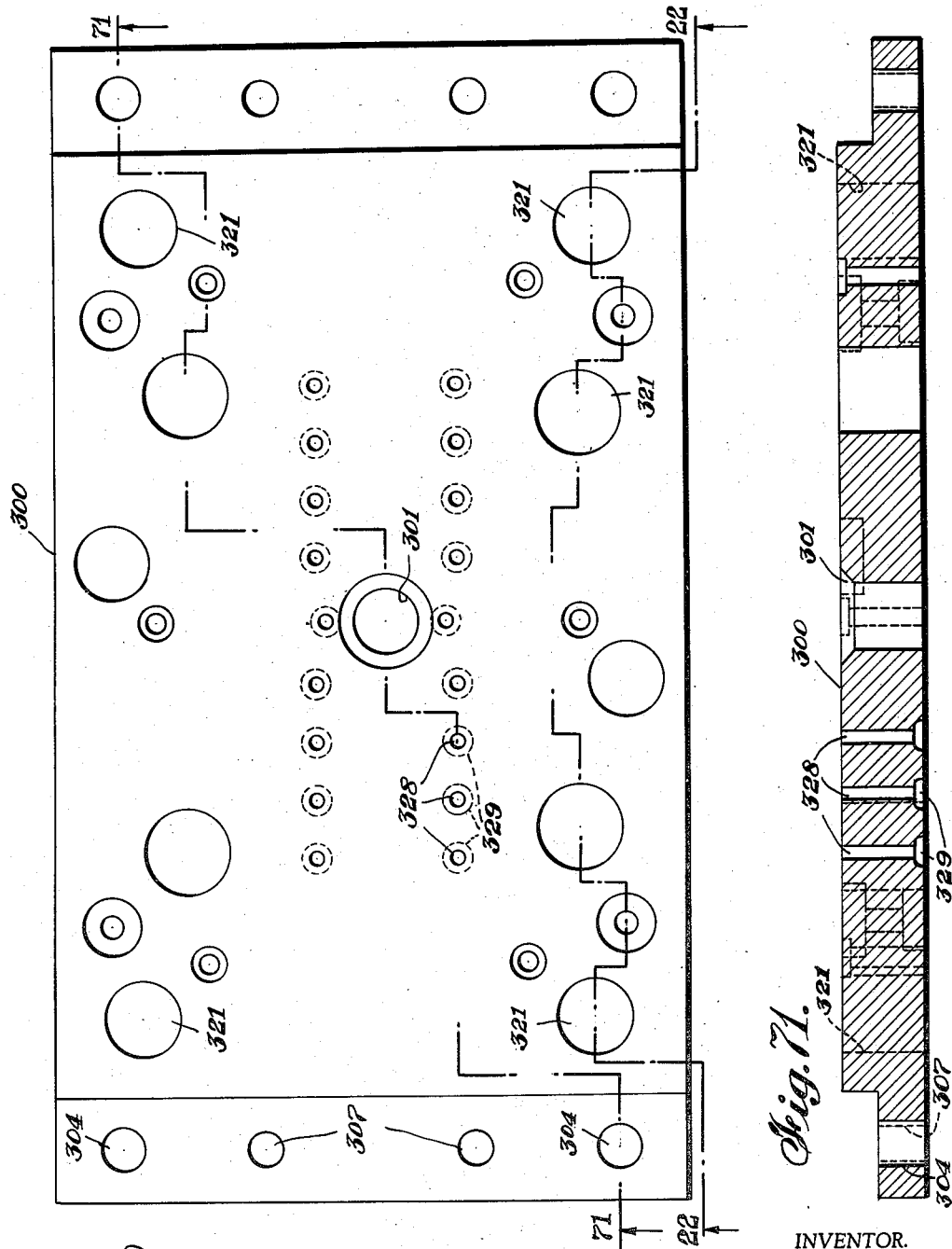

Sept. 25, 1951 W. F. SMITH 2,568,771
BANK STRIP MOLDING MACHINE
Filed Feb. 26, 1947 36 Sheets-Sheet 36
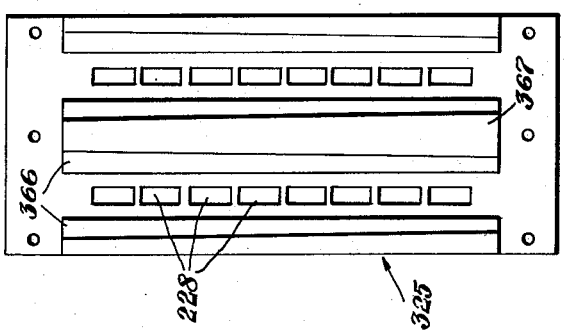
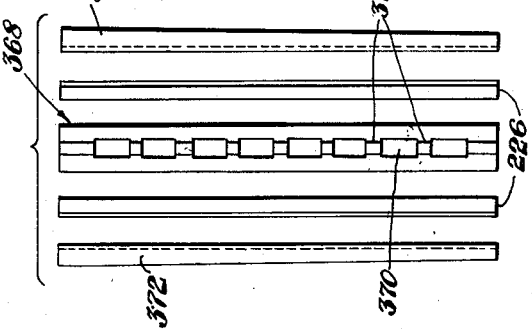
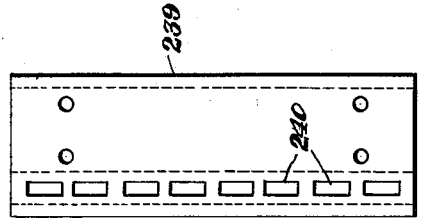
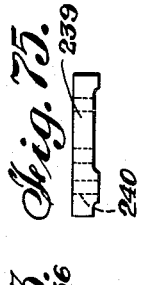
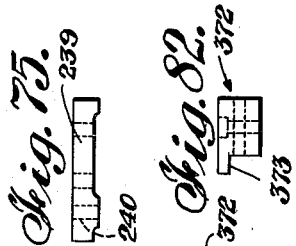
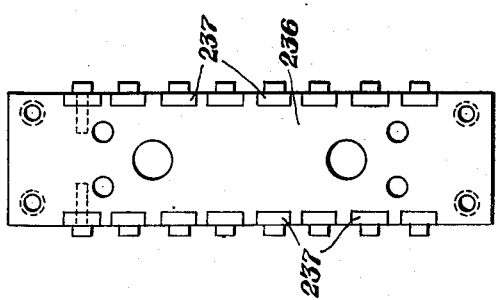
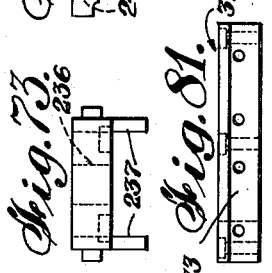
INVENTOR.
WILLIAM F. SMITH
BY *Robert Harding Jr.*
ATTORNEYS Patented Sept. 25, 1951

2,568,771

UNITED STATES PATENT OFFICE 2,568,771

BANK STRIP MOLDING MACHINE

William Francis Smith, Brooklyn, N. Y., assignor to International Standard Electric Corporation, New York, N. Y., a corporation of Delaware Application February 26, 1947, Serial No. 730,969

20 Claims. (Cl. 18—30)

The present invention relates to means for molding bank strip bodies on wires suitable for terminal pins and more particularly to means for molding bank strip bodies in succession on suitable wires drawn from suitable sources of supply.

An important object of the invention is to provide novel and advantageous apparatus for making bank strip bodies with terminal pins secured therein.

Another object of the invention is to provide novel and advantageous apparatus adapted to make on a production basis, articles of the general character specified.

Yet another object of the invention is to provide articles of the general character specified having transverse terminal pins and which are particularly adapted for the application thereto of longitudinal wires for connections in multiple with effective electrical connections between said wires and conductors at selected crossings.

Still another object of the invention is to provide a bank strip body of thermoplastic material containing terminal pins and with end portions having longitudinal grooves in which longitudinal wires are to be secured by heating and flowing thermoplastic material into and around said wires, and apertures in said body through which said wires may be welded to said terminal pins.

A further object of the invention is to provide bank strip bodies containing transverse selector pins and having a central portion with apertures over said terminal pins at selected points to enable welding thereto of longitudinal wires, securing said wires in the plastic material at the ends of said strip, at the inner edges of transverse slots in said ends.

A still further object of the invention is to provide apparatus for molding a plurality of bank strip bodies at one operation on wires drawn from a suitable source.

Other features, objects and advantages will appear upon consideration of the following detailed description and of the drawings in which:

Figure 1 is a side elevation illustrating a loaded wire reel rack with a sheet of wires extending therefrom;

Figure 2 is a side elevation of a molding machine or press showing the wires entering the same, and is as they come from the reel a continuation to the right of Figure 1 when the two parts are arranged together with the wires of the two parts in alignment;

Figures 3 and 4 are top plan views of Figures 1 and 2 respectively;

Figure 5 is an elevation of the discharge end of the molding machine as viewed from the right of Figure 2;

Figure 6 is a cross sectional view of the wire reel rack taken along the line 6—6 of Figure 1;

Figure 7 is a view partly in cross section taken along the line 7—7 of Figure 3;

Figure 9:
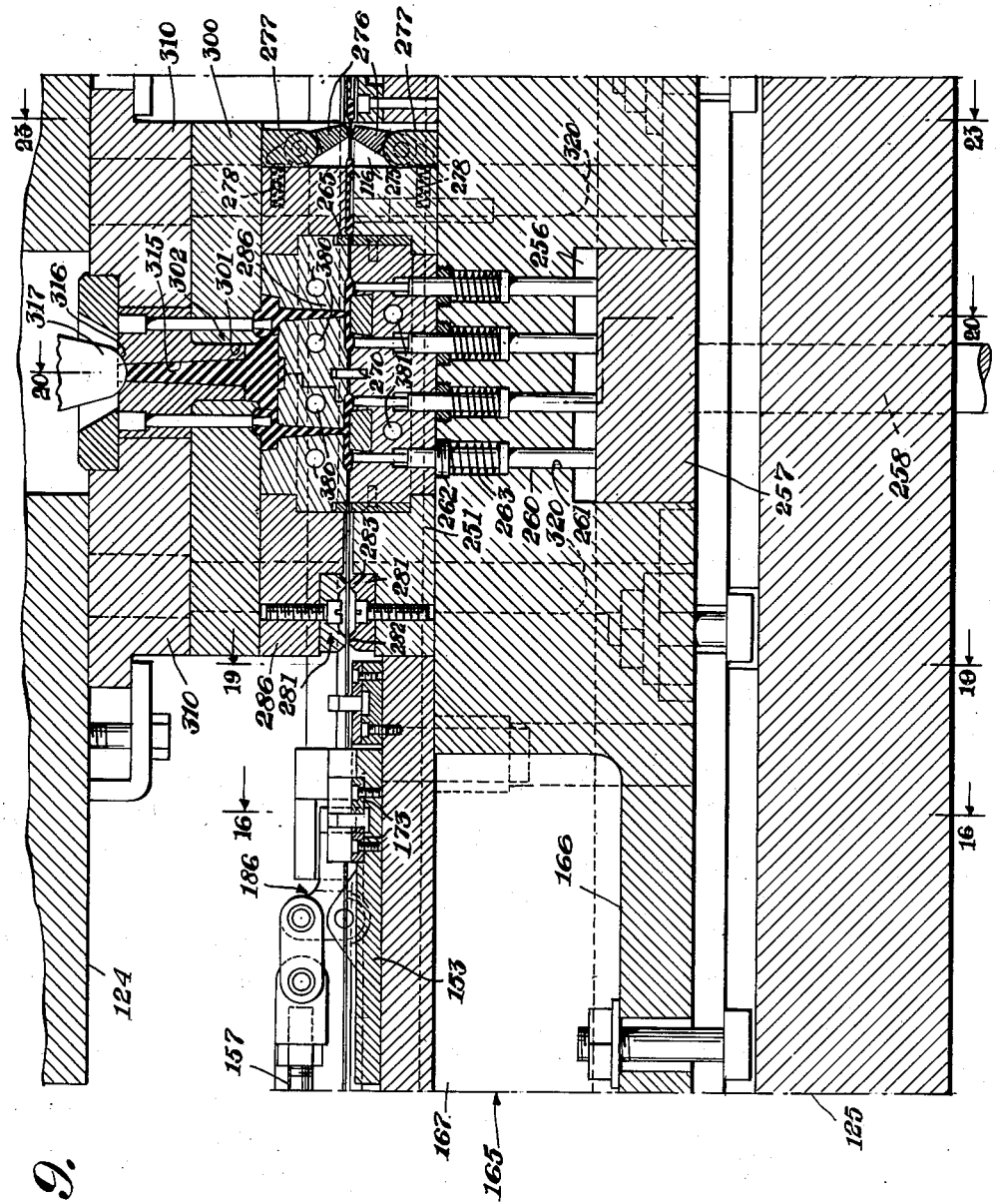
Figure 10:
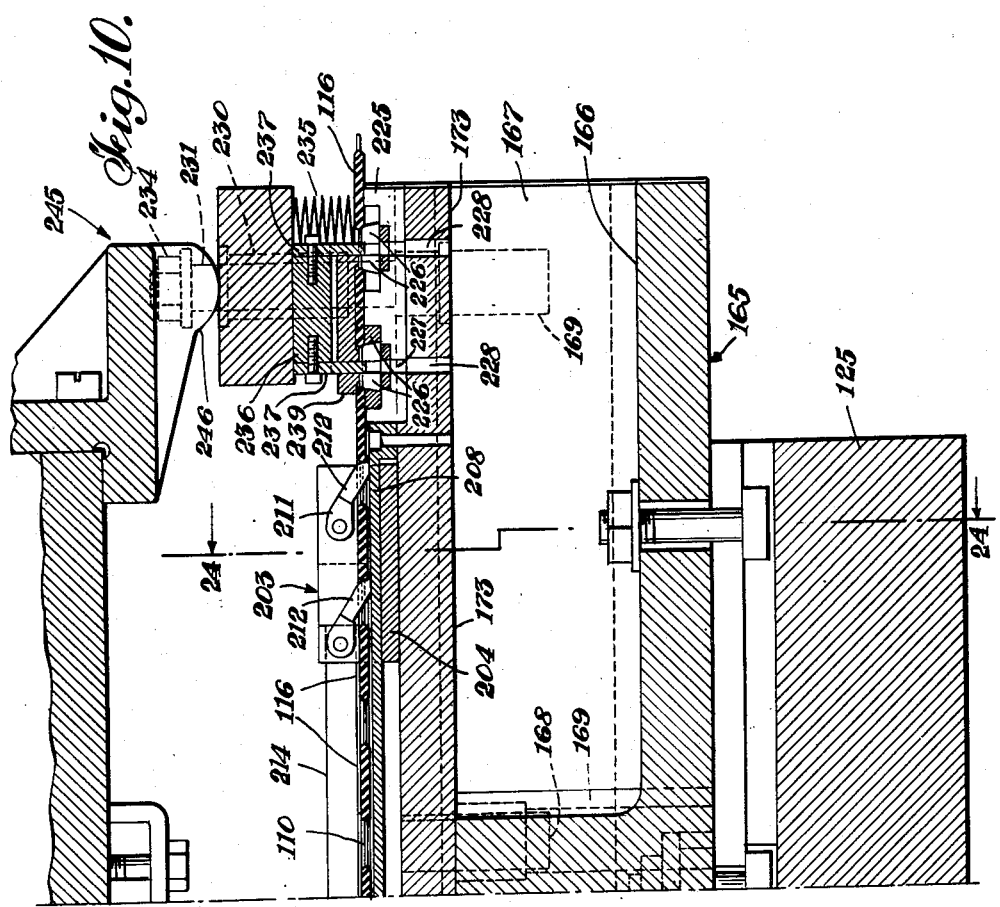
Figure 11:
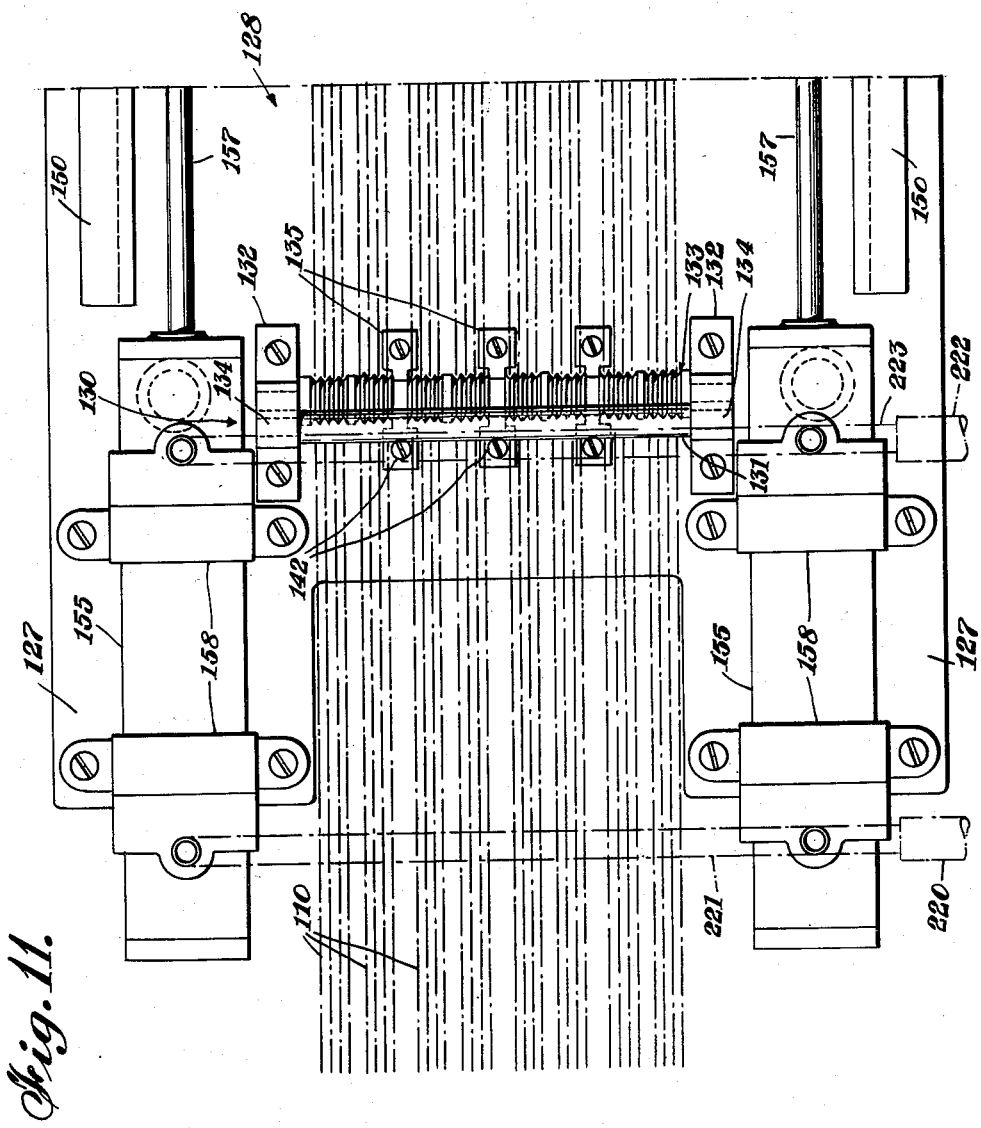
Figure 12:
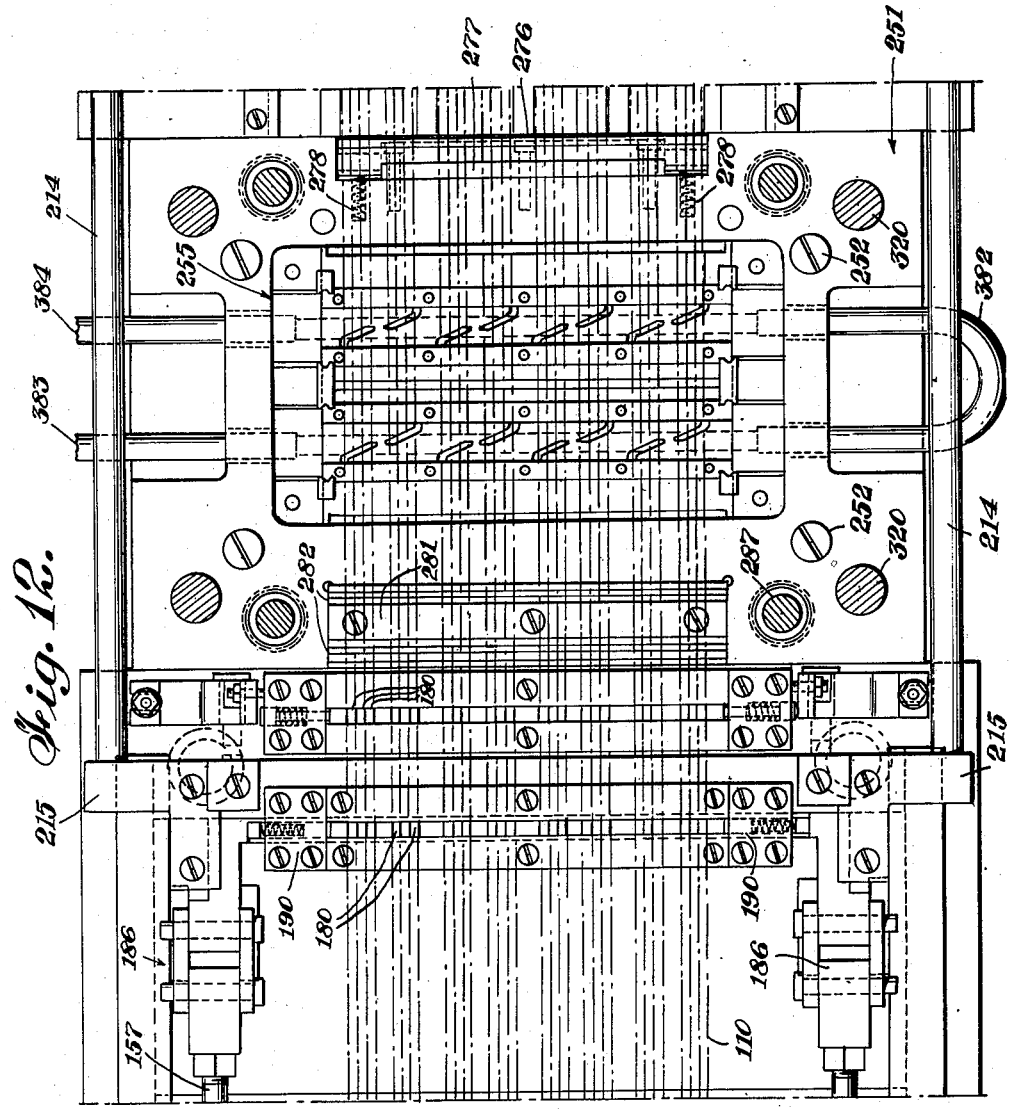
Figure 21:
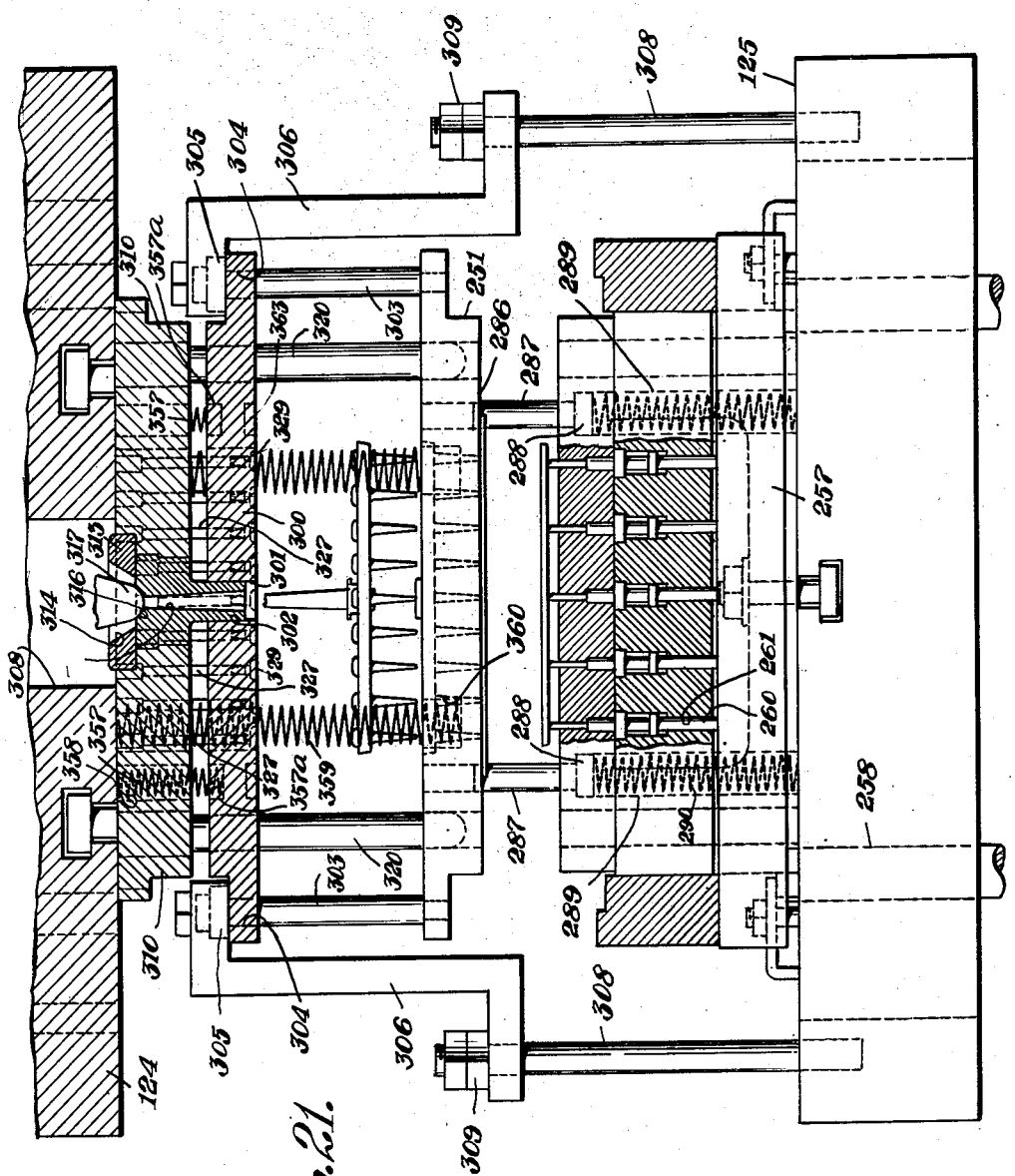

Figures 8, 9 and 10 when placed successively end to end form a vertical longitudinal section illustrating the principal parts of the molding machine;

Figure 11 is a top plan view of Figure 8;

Figure 12 is a top plan view of the structure of Figure 9 with the upper mold section omitted;

Figure 13 is a top plan view of the structure of Figure 10 with the upper cutter parts omitted;

Figure 14 is a vertical transverse section taken on line 14—14 of Figure 8;

Figure 15 is a fragmentary sectional view of one end of the wire guiding mechanism shown in Figure 14;

Figure 16 is a vertical transverse section on the line 16—16 of Figure 9 and illustrating the wire gripping and feeding means;

Figure 17 is a fragmentary detail view of one end of the wire gripping means shown in Figure 16;

Figure 18 is an end elevation of one of the wire gripping elements shown in Figure 17;

Figure 19 is a vertical cross section taken on the line 19—19 of Figure 9 and illustrating principally the wire holding means;

Figure 20 is a vertical cross section taken on the line 20—20 of Figure 9 showing principally the mold section with the upper and lower mold sections in operated positions;

Figure 21 is a view similar to Figure 20 with the mold sections separated;

Figure 22 is a vertical cross section of the apparatus of Figure 20, taken along line 22—22 of Figure 70;

Figure 23 is a vertical cross section taken on the line 23—23 of Figure 9;

Figure 24 is a vertical cross section taken on the line 24—24 of Figure 10;

Figure 24a is a fragmentary view on a larger scale of one of the pusher parts associated with the left group of four wires in Figure 24;

Figure 25 is a vertical end elevation of the structure in Figure 10 as viewed from the right, the cut-off being shown in operated position;

Figure 26 is a view similar to Figure 25 showing the parts in open or released position;

Figure 27 is a top plan view of the plate for supporting the wire feeding carriage;

Figure 28 is a top plan view of the wire feeding carriage with some of the parts removed;

Figure 29 is a top plan view of the cavity plate for the lower mold section;

Figure 30 is a top plan view of the plate for supporting the cut-off mechanism and the carriage which advances the bank strips;

Figure 31 is a top plan view of the frame of the bank strip feeding carriage;

Figure 32 is a top plan view showing principally the base of the ram and also the underlying structure to which it is secured;

Figure 33 is a top plan view of the lower mold section with some of the parts removed;

Figure 34 is an end elevation of Figure 33;

Figures 35 to 38 inclusive are figures showing details of the structure of Figure 33;

Figure 39 is a view similar to Figure 34 but showing the wire-guiding comb in position;

Figure 40 is a central section of the lower mold element showing the central guide plate or comb;

Figure 41 is a vertical section of the lower mold element taken on the line 41—41 of Figure 33 with some of the parts removed;

Figure 42 is an end elevation of the lower mold section as seen from the left-hand end of Figure 33;

Figures 43 to 52 are detailed figures of parts of the lower mold section, Figure 50 in particular being a section taken along the line 50—50 of Figure 49;

Figure 53 is a top plan view of the upper cavity plate for the upper mold section;

Figure 54 is a diagrammatic top plan view showing the position of the wires with reference to the bank strips and the cut-off mechanism;

Figure 55 is a bottom plan view of the upper mold section;

Figure 56 is a side elevation of the upper mold section;

Figure 57 is a top plan view of the upper mold section;

Figure 58 is a vertical section taken on the line 58—58 of Figure 57;

Figure 59 is a bottom plan view of a bank strip;

Figure 60 is a fragmentary sectional view taken on the line 60 of Figure 59;

Figure 61 is an enlarged cross section view through one of the wires of the bank strip;

Figure 62 is a fragmentary top plan view of the bank strip;

Figures 63 and 64 are sectional views of the bank strip taken on lines 63—63 and 64—64 respectively of Figure 59;

Figures 65, 66 and 67 are respectively an end view, a front view and a top plan view of the sprue formed in molding two bank strips;

Figure 68 is a top plan view of a top backing plate for the upper mold section;

Figure 69 is a vertical section taken on the line 69—69 of Figure 68;

Figure 70 is a top plan view of a plate located beneath the plate shown in Figure 68 of the machine;

Figure 71 is a vertical section taken on the line 71—71 of Figure 70;

Figures 72 and 73 are top plan and end views respectively of the punch of the cutter mechanism;

Figures 74 and 75 are respectively top plan and end views of a hold down plate included in the cutter mechanism;

Figure 76 is a top plan view of die parts used in the cutter mechanism;

Figure 77 is an end view of the parts shown in Figure 76;

Figures 78 and 79 are respectively a top plan and end view of the die supporting plate of the cutter mechanism;

Figure 80 is an elevation of the control member shown in Figure 76;

Figure 81 is a side elevation of one of the end plates associated with the die of the cutter mechanism; and Figure 82 is an end view of the part shown in Figure 81.

Referring to the drawings, thirty-two wire reels 100 are supported in a reel rack by pairs of spools 101 mounted on shafts 102. Said shafts 102 are mounted in bearings 103 supported by longitudinal members or beams 104. Transverse members or beams 105 rest on and connect said beams 104 at their ends and just inside of these beams 105 and midway between the outside beams 104 are uprights 106 in the form of channels with their flanges facing toward each other. Said uprights are secured to said transverse beams and are supported from the sides by inclined braces 107 secured at their upper ends to said uprights at their outer faces and at their lower ends to the upper flanges of transverse beams 105.

Longitudinal members 108 are connected to uprights 106 at opposite sides and serve to support two-groove sheaves 109 over which pass wires 110 from said reels 100. The frame of the reel rack is stiffened longitudinally by inclined braces 111 connected at their lower ends to said uprights 106 and at their upper ends to said longitudinal beams 108. Mounted in openings in said members 108 are the reduced ends of pins or shafts 112 on which said two-groove sheaves are rotatable. Said pins 112 are clamped against turning by nuts screwed on their outer ends and engaging the outer faces of said members 108. Sheaves 109 are held in proper positions along said pins 112 by collars 113 held in position by set screws 114. As indicated in Fig. 7 suitable provisions are made for lubrication. The pins 112 are at progressively lower levels from the rear to the forward end of the reel rack (Fig. 1) so as to keep the wires 110 separated above the rack.

As shown in Fig. 3, the sheaves 109 are arranged two on each pin 112 and while arranged generally in four longitudinal lines, are offset gradually to the side in these lines. The two sheaves 109 at the left are positioned with the near one spaced substantially from the adjacent member 108 (Fig. 3). The next pair of sheaves is arranged with one sheave between those of the first pair and the other close to the far member 108. Successive pairs alternate in position with the forward ones successively closer to the near member 108 than corresponding pairs to the rear. The manner in which the wires 110 are fed to the grooves in the sheaves 109 is clearly shown in Figs. 1, 3 and 6.

The wires 110 are intended for separation into terminal or selector pins 115 (Fig. 59). For this purpose the wire must be of suitable gage and of suitable material, preferably of Phosphor bronze. The wire usually comes in tightly wound form and after passage through a straightening machine is wound on the reels 100, which are of sufficient diameter to prevent any substantial set which would interfere with use for the purpose of this invention.

From the wire reel rack the wires 110 are fed intermittently through a molding machine or press in which the bodies of bank strips 116 (Figs. 59 through 64) are molded. These bodies are preferably of thermo-plastic material such as polystyrene. The bank strip bodies and wires from the reels are advanced after each opening of the press. For this purpose, the wires are drawn forward from the reels by means at the entrance side of the press or molding machine proper, and wire thus advanced is drawn into the press as the bank strip bodies just molded are drawn out of the press by means acting on previously formed bank strip bodies beyond the discharge side of the press.

From the wire supply means the sheet of thirty-two wires 110 passes to the press or molding machine proper 120 shown in open position in the assembly view of Fig. 2. The press has as usual, in such machines a heavy frame comprising four posts 121 (Fig. 5) and a base 122. At the top of the frame said posts 121 are connected by one or more top members 123 constituting the top of the frame. Fixed in the upper part of the frame is an upper ram 124 which is stationary. In the lower part of the frame there is a vertically slidable lower ram 125. As indicated on Figure 5, said ram 125 is mounted on a lifting plunger 126 fitting in a usual fluid pressure cylinder (not shown) in the base 122 of the frame.

The wires 110 extend above the space between two arms 127 projecting rearwardly from the body of a plate 128 shown in detail on Fig. 27 and through a tension and guide device 130. This device 130 comprises an upper roller 131 pivotally mounted in end brackets 132 and a lower device 133 comprising a pivot rod 134 fitting closely at its ends in bores in said brackets 132 and supported at suitable intervals by three intermediate brackets 135.

Said brackets 135 divide the space between the end brackets 132 into four parts and in each of these parts there are eight rollers 136 each having a groove 137 and an intermediate spacer 138 separating the groups of eight into groups of fours. Next the brackets 132 are end spacers 139. Said brackets 132 are secured in position by screws 140 entering bores 141 of plate 128 (Fig. 27). The brackets 135 are secured in position by screws 142 entering bores 143 of plate 128. The lower parts of said rollers 136, and spacers 138 and 139 enter a trough 145 in plate 128 (Figs. 14, 15 and 27).

At the sides of plate 128 (Fig. 27) there are two guides 150 secured to plate 128 by screws 151 and having inwardly projecting ribs 152 overlying the edges of a wire feed slide 153 (Figs. 9 and 28) serving as a carriage for wire-gripping means. Reciprocation of the slide 153 and operation of other parts may be effected by means including at each side of the plate 128, a cylinder 155, a piston 156 therein and a piston rod 157. Each cylinder overlies one of said arms 127 and is clamped down by two metal straps 158 and screws passing through the ends of the straps and entering holes 160 in plate 128 (Fig. 27).

Beneath said plate 128 is the left end of a support or bed 165 (Figs. 32 and 32a) extending the full length of the molding press. Said left end of support 165 has a flat bottom 166 and upright side 167 connected at the right by a transverse wall. Guide pins 168 fixed in said plate 128 extend downwardly into bearings in bores 169 in said sides 167 of bed or support 165 thus permitting relative vertical movement but preventing relative horizontal movement. Said bed 165 forms part of the ram and is slightly below the plate 128 when the ram is in its lowermost position. A slight upward movement of the ram will pick up said plate.

Plate 128 is part of a frame 170 including side bars 171 to which the plate is secured by screws in holes 172 at the side edges of plate 128. Connecting the other ends of said bars 171 is a plate 173 which supports a device for advancing pairs of previously formed bank strip bodies 116 and cutting means for separating at each operation two bank strip bodies and selector pins 115 therein from a string of such bodies. Said pins are of course short lengths of wires 110. Said plate 173 has pins 168 extending downwardly into bearings in bores 169 in sides 167 at the right end of bed or supports 165 (Fig. 32). This provision for relative vertical movement between a plate and a support is similar to that at the entrance side of the press.

The wire gripping means on said slide 153 is clearly illustrated in Figs. 9, 16, 17 and 18. Clamping or gripping plates 176 are arranged face to face across the slide with their lower ends and lugs 177 in the same planes projecting therefrom resting in a groove 178 of a member 179. Said lugs 177 are held down by clamping members 180 which also engage the edges of said plates to afford side support above the lugs. The wires pass between the plates at points where there are opposed recesses 181 of such depth that the wires can be gripped without deforming them excessively. The wires may be held in groups of fours by varying the thickness of the plates or inserting spacers at proper intervals.

Preferably the wire gripping device for feeding the wires is actuated at both ends. For this purpose blocks 182 are secured to the slide 153 at the ends of the line of plates and slidably mounted in these blocks are pins 183 with cam heads 184 which are pressed outwardly by springs 185. The outer end surfaces of said heads 184 are inclined downwardly and outwardly. Said pins can be pressed inwardly by cams at the forward ends of bell-cranks 186 pivoted in brackets 187 on said slide at its upper face. The other arms of said bell cranks are pivoted to the front ends of the piston rods 157. It will be evident that simultaneous forward thrusts of the piston rods will first cause the wires to be clamped and then will draw a supply thereof from the wire reels and provide slack to be drawn into the molding machine. On the return stroke the clamps are opened and then the clamping device is retracted. The swinging movements of the bell cranks should be limited by suitable stops.

The wire gripping device to hold the wires against rearward movement is similar to the feeding gripping-device except for the actuating means, and that the device is mounted on plate 128 and not on a slide. In this device there are gripping plates 189 similar to gripping plates 176 and similarly mounted. At the ends of the set of gripping plates there are blocks 190 with guiding means for pins 191 through which gripping action is effected. These pins are urged outwardly to limiting positions by springs 192. When the pins 191 are in their outermost positions, the wires are free for forward movement.

The gripping plates 189 and blocks 190 are carried on a base 193 which is secured to plate 128 at the right end thereof (Fig. 27) by screws which enter threaded bores 194 in the plate 128. Outside of the ends of said base 193, the plate 128 is provided with cut-outs 195 open to the right. In each cut-out a bell crank 196 is pivoted on a pivot or screw 197 with an upright arm 198 and a horizontal arm 199. The outer end of the corresponding pin 191 passes through the upper end of arm 198 and has members in fixed position thereon to engage opposite sides of the lever arm 198.

The horizontal arm 199 is urged upwardly by a spring 200 seated in a bore in an upright side 167 of the support 165. Upward movement of the outer end of the arm 199 is limited by a nut 201 on a screw 202 which is screwed into a bore in the upright side 167 and may be adjusted by inserting the edge of a screwdriver in a slot in its end. When the lower ram is in its lowermost position, the upright 167 will be separated from plate 128 and will swing bell crank 196 to release the wires at the stationary gripping device.

A slight upward movement of the lower ram will cause the wires to be gripped at this point. Obviously the wires 110 can be fed only when the lower ram 125 is in its lowermost position.

The plate 173 is secured to said side bars 171 in the same general way as plate 128 at the other end of bed 165. At the forward part of plate 173 is a cutting device which will be described hereinafter. To the rear of the cutting device, there is mounted on the upper surface of plate 173 a reciprocatory carriage 203 having a base plate 204 slidable on plate 173 and guided thereon by guides 205 having ribs overlying the edges of base plate 204. Above said plate 204 there is a fixed plate 206 with raised portions 207 to support the ends of bank strips 116 and three intermediate ridges 208 to support the bank strips between groups of eight wires. Said plate 206 is secured at its ends to plate 173 at points just beyond the ends of the path of movement of plate 204. Extending upwardly from plate 204 are side walls 209. Extending transversely between said walls 209 and above the path of the bank strips are two rods 210 which serve as pivots for members or pawl carriers 211 extending from side wall to side wall one behind the other.

Each of these pawl carriers 211 is provided with eight pawls 212 each adapted to engage the back edge of a bank strip at each point where a group of four wires is located. As best shown in Fig. 24a, these pawls are provided with two flared grooves 213 which receive two of the wires, the two remaining wires being at the sides of the pawl. These pawls will readily ride back over bank strips and in their forward movements will advance the bank strips and wires as desired.

The reciprocatory carriage 203 is operated from the wire-gripper slide 153 at the rear end of the press. For this purpose strong brackets 215 project from the side walls 209 and are provided at their outer ends with openings to receive the forward ends of actuating rods 214 connected at their rear ends to brackets 215 on wire-gripper slide or carriage 153.

With the ram down in its lowermost position the wires 110 will be released from the clamping or gripping plates 189 of the holding device. At this time both wire-gripper slide or carriage 153 and the reciprocatory carriage 203 are in their rearmost positions. Forward movement of said carriage 153 would cause the wires to be gripped thereto and then advanced and the two sets of pawls 212 in engagement with the back edges of two bank strips would correspondingly advance the bank strips so that two bank strips would be positioned in the cutoff device at one time. Rearward movement of the bank strips during rearward movement of the carriages 153 and 203, is prevented by detent means to be described hereinafter. Of course the wire gripping device for holding the wires against movement in either direction is effective only after the ram has risen a short distance.

In this connection, it may be said that advance of the carriages 153 and 203 may be effected by admitting fluid, such as oil under pressure to the rear ends of said cylinders 155 through a flexible tube 220 to an overhead pipe 221 above the rear ends of said cylinders and connected thereto. Rearward movement of the carriages may be effected by admitting oil under pressure to the front ends of the cylinders through a flexible tube 222 and a pipe 223 connected to said front ends. The flexible tubes are required because of the upward and downward movements of the lower ram.

Obviously the cutting off means should operate only when the wires are held against longitudinal movement. To make sure of meeting this requirement, there is a complete cutoff device but there is nothing to operate it until the lower ram reaches its top position.

Said cut-off device is mounted on and cooperates with said plate 173. In a recess at the discharge end of said plate 173 is a member or plate 225 in which are mounted two die assemblies, each comprising parallel die members or blades 226 spaced apart to correspond to the short length of wires 110 to be cut off between bank strips 116 in serving the first and second leading bank strips from a string thereof advanced from the molding press. The short lengths of wires 110 cut off between the bank strips drop out of the machine through openings 227 in the plate 225 and openings 228 in said plate 173. Details of the lower die assembly are shown in Figs. 76 through 82.

The upper part of the cut-off mechanism comprises a horizontal transverse member or beam 230 guided for vertical movement by pins 231 secured to plate 173 and passing through guide sleeves 232 in said beam 230. On reduced upper ends of said pins 231 are washers 233 and nuts 234 to limit the upward movement of beam 230 relative to plate 173 under the urging of compression springs 235 interposed between said beam and plate with their ends in suitable recesses.

Secured to said beam 230 is a bar 236, to the opposite sides of which are secured sets of eight blades 237. Each of said blades is of such thickness as to cooperate with the edges of opposed die blades 226 and of sufficient width to cut a group of four wires 110 over which it is positioned. The upper part of each blade 237 is fitted into a recess in said bar 236 and is retained in the recess by suitable means such as a screw.

The upper part of the cutter is also provided with means for holding the bank strip between the two sets of dies and also the next following bank strip firmly in position during a cut-off operation. This means comprises a plate 239 having near one edge a line of openings 240 receiving the blades 237 of the rear set, and an edge which engages the rear sides of the blades of the last or forward set. At its bottom said plate 239 is shaped to fit over a bank strip between the two cutting devices, engage the wires at the left side only (Fig. 10) of the blades 237, engage the wires at both sides of the blades 237 of the rear cutting device, and engage the leading of the next bank strip. This arrangement guards against accidental movement of bank strips during the cutting operation.

Said plate 239 is guided in its movements relative to bar 236 by the rearward set of blades 237 and by rods 241 slidable in suitable bores in said beam 230 but limited in their downward movements by engagement of heads 242 thereon with said beam. Preferably the bores containing said rods 241 are countersunk at their upper ends to receive said heads 242 when said plate is in its lowermost position. Said plate 239 is urged downwardly by springs 243 interposed between said plate and said beam 230. Certain details of the upper part of the cutter are shown in Figs. 72 through 75.

The wire cutting operation takes place only when the bed 165 and the plate 173 at the discharge end of the machine are lifted by the lower ram 125 until said beam 230 strikes a bumper 245 on the upper ram 124 (Figs. 2, 10, 25 and 26). Preferably said bumper 245 has two rounded projections 246 arranged to strike beam 230 at opposite sides of its middle so as to avoid any tilting thereof and effect a straight downward movement.

As shown in Figs. 32 and 32a, the central part 250 of bed or frame 165 (Figs. 32 and 32a) is in the main closed but has various holes therein for uses to be described hereinafter. A lower cavity plate 251 (Figs. 12 and 29) rests on said central part 250 and is secured by means of screws 252 (Fig. 12) in holes 253 (Fig. 29) and holes 254 (Fig. 32). Mounted in the central part of the cavity plate 251 is a lower mold section 255 (Fig. 12). Details of the lower mold section 255 are shown in Figs. 33 through 38 and Figs. 41 through 52.

In its lower face said central part 250 of bed 165 is provided with a transverse groove or channel 256 (Fig. 9) to receive a transverse member or beam 257 which is utilized to support the frame 170 by engagement with the side bars 171 of said frame. After the lower ram 125 is raised a short distance above its lowermost position, said beam 257 rests on said ram (Fig. 9) and the same is true for any higher position of the ram. However, this beam is rigidly connected to the upper ends of vertical rods 258 which extend downwardly through guide bores in the ram and when the ram is very close to its lowermost position, the lower ends of said rods engage fixed abutments or stops and support said frame 170 as the lower ram sinks farther. This causes release of wire-gripping plates 189 which at higher positions of the ram grip the wires and prevent longitudinal movements thereof.

In the final downward movement of the lower ram, said beam 257 stops the downward movement of mold-stripping or ejector pins 260 so that their upper ends project into the mold cavities and eject any bank strip body located therein. To accommodate these pins, the central part 250 of the bed 165 has twenty holes 261 in four transverse rows of five each so that each side of the frames of two bank strips in the mold will be engaged by the upper reduced ends of five pins 260. When the lower ram is raised a very short distance from its lowermost position, said pins 260 are stationary until the ram lifts the beam 257 whereupon these pins sink in the lower molds until their upper ends constitute parts of the bottom of the lower molds or mold sections 255. Said reduced upper ends of these pins 260 are shown in Fig. 33.

Said holes 261 in the bed have lower parts corresponding in diameter to the main bodies of the pins and short upper parts of larger diameter to accommodate collars 262 fixed on the pins and also helical springs 263 interposed between the upper faces of said collar and the lower sides of rings 264 secured in countersunk recesses at the upper face of this position of the bed. The main bodies of said pins extend into holes in the lower mold section and the reduced upper ends of the pins pass through openings of corresponding cross section in the lower mold section.

Combs 265 (Fig. 39) extend across the wires 110 at the rear and forward edges of the mold section and a comb 266 of less depth is mounted midway between said combs 265 (Figs. 9, 33, 34, 39 and 40) to assist in accurately spacing the wires to fit into grooves 267 of the lower mold section 255. Said combs 265 are mounted in suitable recesses 268 and are held in place by screws 269 (Figs. 9 and 30). Said comb 266 is mounted in a groove or slot 270 and is provided at its ends and at its lower edge with longitudinally extending lugs 271 (Fig. 40). The comb 266 is secured in said groove 270 by members or holders 272 (Fig. 40) of which details are shown in Figs. 37 and 38. The lugs 271 of the comb 266 fit into recesses 273 in said members 272 and beneath an overhanging part 274. Said members 272 may be held down in position by suitable means such as screws.

At the discharge side of said lower cavity plate there is an elongated cutout 275 in which is located one-half of a detent device for preventing rearward movement of completed bank strips at the discharge side of the molding press. The half of the detent device on the forward edge of the lower cavity plate 251 comprises an elongated pawl member or pawl 276 pivotally mounted on bracket 277 in said cut-out 275 and pressed by one or more springs 278 which are mounted in bores 279 and act to swing the free edge of the pawl member 276 upwardly. The movements of the pawl in opposite directions are limited by suitable stops. A corresponding downwardly projecting pawl member is mounted on an upper cavity plate as will be suitably described hereinafter.

At the rear edge of said lower cavity plate there is a transverse recess 280 of rectangular cross section to receive a bar 281 of suitable material, such as metal. This bar has two parallel ridges 282 which cooperate with similar means on an upper cavity plate, as will be described hereinafter, to deform the wires to enable them to be held more firmly in the material, such as polystyrene, of the bank strip bodies.

The lower mold section or plate 255 is illustrated sufficiently in Fig. 33 to show that a bank strip molded between said mold section and an upper mold section 285 (bottom plan view in Fig. 55), would have a bottom plan view such as shown in Fig. 59 and a top plan view like that shown in the fragmentary top plan view of Fig. 62.

Said upper mold section 285 is fixed in an upper cavity plate 286. Guide pins 287 project upwardly from lower cavity plate 251 into bores 288a in said upper cavity plate 286. Said pins 287 have heads 288 which are slidable in aligned bores 289 in said lower cavity plate 251 and central part 250 of said bed 165. However, upward movement of a pin 287 is limited by reducing the bore at the upper part of cavity plate 251 to a size capable only of receiving the shank of a pin 287. The pins are urged upwardly by springs 299 interposed between heads 288 and the lower ram 125.

It should be noted that the upper cavity plate 286 is provided at its forward edge with a pawl member 276 corresponding to that on the lower cavity plate 251 and that at its rear edge it is provided with a bar 281 corresponding to that on the lower cavity plate.

Said upper mold section 285 is illustrated most clearly in Figs. 55 through 58. As shown in Fig. 55 the upper mold has four channels 291 which with end passages 292 and 293 shape the upper part of the bank strip frame. Between the channels 291 for each strip there are rows of raised portions 294 with channels 295 therebetween. Each raised portion 294 has four wire-receiving grooves and fits over the corresponding group of four wires, leaving the channels to form cross connections for the frame sides. In order to feed the hot thermoplastic material to all parts of the mold, the material is supplied at nine points for each row, for example at the inlets 296 (Fig. 55).

Said inlets 296 are the reduced ends of tapered passages 297 (Fig. 56) which are connected at their upper or larger ends to parallel channels 298 connected by a central cross channel 299 through which the hot plastic material is fed to parallel channels 298.

Above said upper mold section 285 and upper cavity plate 286, there is a sprue-stripping plate 300 which at the time for injecting the plastic into the closed mold, closes from above the channels at the top of the mold section 285 and has a central opening 301 through which a supply nozzle 302 may project.

Four pins 303 are fixed at their lower ends to the four corners of upper cavity plate 286 and extend slidably through openings 304 in said plate 300. At their upper ends said pins are provided with stops 305, so that not only do the pins provide a guiding action but they also limit the separation of plates 286 and 300.

Between said openings 304 at each end of plate 300, an inwardly extending flange at the upper end of a bracket 306 rests on the top of plate 300 and is secured thereto by screws entering holes 307 (Fig. 70). At its lower end each bracket 306 has an outturned flange with an opening through which slides a rod 308 of which the lower end is fixed to the lower ram and the other end is provided with an adjustable stop 309.

A plate 310 above said plate 300, is suspended from the upper ram 124 and fixed with reference thereto. Said plate 300 may be supported from upper ram 125 by means of posts 320. Said nozzle 302 has a lower portion which fits in central opening 301 of plate 300 but does not extend to the lower face of the plate, and an upper portion of greater diameter fixed in an opening 311 in said plate 310 with its lower end flush with the lower face of the plate in position to be engaged by the top of plate 300 when the latter is raised to its uppermost position. As indicated in Fig. 69, the lowermost position of said nozzle 302 may be determined by engagement of a downwardly facing shoulder on the nozzle with a shoulder 312 in the wall of the central opening.

At the upper end of said opening 311 is a countersunk portion receiving a plate or guide ring 312 having a frusto-conical opening 314 with its smaller end down. The nozzle 302 has an axial opening 315 tapered upwardly and terminating in a cup 316 into which fits a convexly curved end of another nozzle 317 from which fluid plastic is forced through said opening or passage 314. Said nozzle 317 extends downwardly through an opening 318 in the upper ram 124.

Fixed in said upper plate 310 and projecting downwardly therefrom are guide rods or posts 320 (Figs. 21 and 68) which when the lower ram is down, project downwardly through openings 321 in plate 300 (Figs. 21 and 70) and openings 322 in upper cavity plate 286. In alignment with said posts 320 are openings 323 in the lower cavity plate 251 (Fig. 29), and openings 324 in the central part 250 of bed 165. When the lower ram is raised, the posts 320 will enter said openings 323, 324 and 325.

In the upper or backing plate 310 are bores 326 with countersunk upper ends, and in the bores are pins 327 with heads fitting in said countersunk upper ends and shanks fitting the smaller parts of said bores. The heads of said pins are engaged at their top to prevent upward movement and their shanks extend downwardly into bores 328 in plate 300. The lower ends of said pins 327 are all at the same level and project below the lower face of plate 300 when this stripping plate is in contact with backing plate 310. When said plate 300 is drawn down a short distance the lower ends of said pins 327 are drawn into said bores to a level above concave downwardly-facing recesses 329 at the lower ends of said bores. The pins are reduced in size just above their ends in such manner as to provide downwardly flared lower ends without increasing the diameters of the extreme lower tips.

Although the machine of the present invention might be utilized to mold bodies of different shapes on wires and the number and spacing of the wires might be varied, the preferred form of article to be made is a bank strip 116 illustrated in detail in Figs. 59 through 64.

Said bank strip 116 has an integral body preferably of material such as polystyrene molded on said wires 110 which are cut between said bodies to provide terminal or selector pins 115. Each bank strip body comprises a frame in which is a panel 330. The frame comprises sides 331 transverse to the terminal pins 115 and ends 332. Fig. 59 is a bottom plan view of the bank strip as it is molded, that is the shape produced by the lower mold assembly. The bottom of the bank strip (shown in Fig. 59) is provided with eight grooves 333 in the panel extending transversely to the terminal pins and deeper extensions of these grooves in parts or ribs 334 projecting beyond the face of the panel. Just outside of these parts are slots 335 in set back portions 336 of said ends 332.

Said grooves 333 are formed to receive another set of wires which are to be connected electrically to said terminal pins at points thereof exposed in diagonal slots 337 in said panel. There are eight of these slots 337, half of which extend across four of said grooves 333 and the other half extend across the remaining four grooves 333. Said slots 337 are grouped in pairs which taken together cross all of the grooves, being offset at their inner ends to accommodate cross members 338 at the opposite side of the panel. Between said pairs of slots but at the opposite face of the panel are three cross members 339. Midway between the ends 332 of the frame there is a slot 340 extending through the panel 330 and the middle cross member 339.

The slots 335 accommodate cutting members to sever wires held in said grooves 330 by means including welds between said wires and terminal pins 115. The central slot 340 is provided to receive a comb to guide wires into said grooves 333. As shown in Fig. 61, each wire 110 is deformed by ribs 282 of plates 281 at the entrance to the molding press (Fig. 9) so that there are depressions 341 with flat parallel bases 342. These deformed portions are molded into sides of bank strip frames and help to hold the wires against longitudinal displacement (Figs. 59, 62, 63, 64).

The lower mold section 255 with some parts omitted is shown in Figs. 33 and 34 and details are shown in Figs. 35 through 52. Figs. 33 and 34 show the lower mold section with one-half incomplete. Fig. 41 shows a cross section of the body of the lower mold section having undercut grooves 345 to receive blocks 346 (Figs. 49 and 50) with ribs 347 to form grooves 333 in panels 330 of bank strips 116. Said blocks 345 are provided with grooves 348 to receive bars 349 having at their upper faces grooves 350 to receive wires 110. There may be two blocks 346 for each bank strip and between adjacent ends thereof there may be positioned a member 351 to provide the central bank strip slot 340. Members similar to 351 may be used to make slots 335 at the end of a bank strip. Members 352 (Figs. 45 and 46) may be used to form the grooved transverse ribs 334. Member 353 (Fig. 48) is part of the end assembly (Fig. 33) and cap 354 (Figs. 33, 34, and 47) is used to hold the assembly together. Members 355 (Figs. 35 and 36) may be used at the corners (Fig. 33) to hold parts together and assist in shaping the corners of the bank strips.

Fig. 55 is a bottom plan view of the upper mold section showing raised portions having grooves 356 to receive halves of the wires 110, and recesses to receive the upper parts of a molded body.

Referring to Fig. 22 it is seen that springs 357 are connected at their lower ends to the bottom of suitable recesses 357a in plate 300 and extend upwardly through bores 358 in plate 310. Also upper cavity plate 251 is urged away from the upper ram by springs 259 of which the lower ends are located in shallow bores 360 in plate 251 and extend upwardly through bores 361 in plate 300 and bores 362 in plate 310. Also when the lower ram is in the upper part of its path, the plate 300 is supported by said pins 287 passing through bores 363 in plate 286 and urged into shallow recesses 364 in the bottom of plate 300 by said springs 290. Certain of these springs may be utilized both to urge members apart and to resist separation beyond certain distances.

Details of the upper part of the cutoff means are shown in Figs. 72 through 75. The top plan view of Fig. 72 shows beam or bar 236 with the upper ends of blades 237 secured in recesses in the sides thereof. Fig. 73 shows an end view of the structure shown in Fig. 72. The hold-down plate 239 with openings 240 to receive blades 237 is shown in Fig. 72 in top plan view, and in end view in Fig. 75.

Details of the lower part of the cutoff device are shown in Figs. 76 through 82. Figs. 76, 77 and 80 show details of members including cutter blades 226, which are assembled in the two longitudinal depressions 365 of plate 225. There are steps 366 in the side walls of these depressions and the upper part of the central or dividing wall 367 is tapered (Fig. 78) to form a wedge. The vertical inner surfaces of the outer walls above the steps are also inclined longitudinally. Mounted in the space between said steps 366 of each depression or channel 365 is a member 368. Said member 368 comprises a base 369 with eight openings 370 which are positioned over said openings 228, the cross connections between said openings 370 extending above said base to provide spacers 371 for said dies or blades 226 between the parts where the blades 237 pass. After two blades 226 and a member 368 have been assembled in one of the depressions or channels 365, wedge members 372 are inserted (from above in Fig. 78) and act to wedge the parts in place. After assembling the parts in both channels 365, they are secured in position by securing over the ends of plate 225, members 372a having ribs 373 overlying the ends of members 226 and 372.

The apparatus includes injections means 375 shown conventionally in Figs. 2 and 5. Material is supplied to a hopper 376 (Fig. 2) and is used in the machine as required. The material may be put into fluid form for injection by use of a steam to heat the same. Parts of the injection means (Fig. 2) are fluid valve lever 377 and fluid plunger 378.

The material when injected into the two cavity mold is so hot that cooling is required. As illustrated in Fig. 9 there are four cooling fluid ducts 390 in the upper mold and two cooling fluid ducts 391 in the lower mold. As shown in Fig. 12 said ducts 391 are connected at one side of the machine by a flexible tube or hose 392, the cooling fluid being introduced and withdrawn at the other side of the machine through hose 393 and 394. The cooling fluid can be passed through the upper ducts 390 in the same general manner.

A general statement of operation in connection with some additional disclosure will now be given. Assuming that the lower ram 125 is down, and that the feeding mechanism has operated to withdraw previously formed bank strips 116 from the molding press. The bed or base 165 (Figs. 32 and 32a) rests on and is fixed to the lower ram 125 of which it may be considered a part. Immediately above the left and right ends of said bed or frame 165 are plates 128 and 173, respectively, which together with side bars 171 constitute a frame 170.

Said side bars 171 rest on a transverse beam 257 which is in a transverse channel 256 in the lower face of the central part 250 of said bed 165. At this time the bar 257 is supported by pins or posts 258 resting on fixed parts, and holds the plates 128 and 173 raised above the ends of the base or frame 165. Said plate 128 carries the feed-operating cylinders 155, the tension and guide device 130, the wire-feeding slide or carriage 153, and the wire-holding or locking device comprising gripper plates 189. Said right hand plate 173 carries the strip-feeding carriage 203 and the cutoff means. With said plates 128 and 173 raised, the wires would be higher across the central portion of bed or frame 165 than at other times.

At this particular stage, the wires are the only elements to be supported by the tension thereof. However, the wires would tend to support bank strips as soon as they are ejected from the lower mold or die by ejector pins 261. The lower ends of said pins 261 rest on said bar 257 which engages the lower faces of said side bars 171 of frame 170. When said bar 257 rests on the lower ram 125 as it does except as the lower ram approaches its lowermost position, the upper ends of pins 260 complete the bottom of the cavity of the lower mold or die. This is the case except when the beam 257 is separated from said lower ram due to support of the beam 257 by pins or posts 259.

This separation causes the ejector pins to move upwardly and into the lower part of the mold to eject bank strips 116 upwardly therefrom. While the parts are in the position just indicated, the wire feed carriage 153 and the bank-strip-feeding carriage 203 are advanced simultaneously due to their connection by rods 214. At this time the gripping plates 189 of the holding device are released due to means illustrated most clearly in Fig. 19. The wires 110 are however, gripped by the gripper-plates of wire-feeding carriage and at the opposite side of the molding unit bank strips 116 are held against return movement at this time by pawls 212 on the carriage 203 (Figs. 10 and 13), thus holding bank strips in the cutting device for cutting the connecting wires between upper blades 237 and lower blades 226.

The lifting of the lower ram 125 is then started. Inasmuch as the ejector pins rest on beam 257, the lower ram in the beginning of its upward movement raises the frame or support 165 until the heads of pins 261 are flush with the bottoms of the cavities in a lower mold or die. At this time the lower ram picks up the beam 257 and the ends of the support 165 pick up the plates 128 and 173. During this preliminary part of the upward movement the wires are gripped between the gripping plates 189. The wires are properly positioned over the lower mold or die including a lower cavity plate 251 and lower mold section 255, by means of said end combs 265 (Fig. 39) and centre comb 266.

Further upward movement of the lower ram moves pins 287 upwardly through bores 288 until the lower mold or die comprising the lower cavity plate 251 and lower mold section 255, picks up the upper mold section 285 and upper cavity plate 286. In this movement the two cavity plates are maintained in proper alignment by spring pressed pins 287 having their upper ends in bores 288a of the upper cavity plate 286. Posts 320 are secured at their upper ends in backing plate 310 and with the lower ram 125 down, said posts or pins 320 extend downwardly through opening or bores 321 in plate 300 spaced downwardly from plate 310 at this time, and into a bore 322 in upper cavity plate 286. Lower cavity plate 251 has bores 323 aligned with posts 320 and the central part 250 of support 165 has bores 324 in alignment with posts 320.

Pins 303 carried by said upper cavity plate 286 move upwardly through openings 304 in the ends of plate 300 and the stops 305 at the upper ends of pins 303 pass upwardly into bores 328 in upper ram 124. Eventually said stripper plate 300 is engaged by plate 286 and pressed against upper ram 124. This causes the lower ends of pins 327 to project from the lower face of said stripper plate 300. The reduced portion of each pin 327 provides a shoulder which at this time is flush with the surface of the corresponding downwardly-facing recess or cup 329. Below said shoulder is a downwardly flared or frusto-conical lower end 319 of the pin.

As the upper cavity plate 286 containing the upper mold assembly, and the sprue-stripper plate 300 are brought together and plate 300 approaches plate 310, the wires 110 are engaged between ridges 282 or bars 281 on opposite sides of the sheets of said wires. In this way the wires are not only gripped and held against lengthwise movement but are somewhat deformed as indicated at 342 in Figs. 59, 61, 62, 63 and 64. As shown in Fig. 9, one of said plates is attached to the rearward edge of lower cavity plate 251 and the other is attached to the rearward edge of the upper cavity plate 286.

At substantially the same time, the bank strip detent pawl 276 at the forward edge of the lower cavity plate 251 is brought into cooperative relation with a corresponding detent 276 at the forward edge of the upper cavity plate 286. The lower detent pawl 276 is of course in position for use at all times. As the two pawls 276 meet at the end of the upward movement of said lower ram 125, the holding edges of the pawls tend to move forwardly and put the wires in the press under greater tension.

Also at the time the lower ram reaches its uppermost position, projections 246 on a bumper 245 fixed on said upper ram are struck by beam 230 of the cutoff and the wires are severed at two different positions thus cutting off two individual bank strips (Fig. 10).

At this time it is convenient to move wire gripper carriage or plate 153 and bank strip feeding carriage 203 to their rearmost positions.

The parts are now in position for injection of a charge of the plastic material. Material thus injected passes from nozzle 317 into a downwardly flaring conical passage 214 in a nozzle 302 fixedly secured to plate 310 and fitting into a central passage in stripper plate 300. From the lower end of passage 314, the plastic flows into cross channel 299 and parallel channels 298 supplied from channel 299, these channels being closed at the top by the lower face of stripper plate 300. From the channels 298, the plastic is forced downwardly through tapered passages 297 terminating in small openings 296 through which the plastic passes into the mold or die cavity. The general arrangement of passages is illustrated in Figs. 20, 57 and 58.

The plastic left in the passages through which plastic is forced into the mold cavity, forms a sprue 400 (Figs. 65, 66 and 67). This sprue comprises a main stem 315a, a cross member 299a, parallel members 298a, and nine tapered pins 297a extending downwardly from each member 298a. At the upper surface of each of said members is a button 329a formed by one of said recesses 329 at the lower face of plate 300. As indicated in dotted lines in Fig. 66, the flaring tips 319 at the lower ends of pins 327 are enclosed in corresponding sockets 319a in said sprue 400 in and below said buttons 329a. As will be brought out more fully hereinafter, this inclusion of the flared lower ends of pins 327 is utilized in removing the sprue from the parts of the machine. Of course, stripping of the sprue from pins 327 will change the shape of each socket in the sprue from a tapered shape to approximately a cylindrical shape.

After the molding of two bank strip bodies in the two-cavity mold has been completed, the lower ram 125 is lowered. The lower cavity plate 251 therein, accompanies the ram 125 in its downward movement. The upper cavity plate 286 with the upper mold section therein, moves downwardly with the lower mold section until the stops on pins or bolts 303 engage the upper face of plate 300. In this movement the upper cavity plate is separated from the sprue 400 which is suspended from the lower ends of pins 327. The sprue then drops upon upper mold section 285 and is removed in any suitable manner before the next operation.

In the meantime the bank strip has remained in the lower mold section 255. As the ram 125 approaches the lower end of its path, the downward movement of bar 257 is stopped causing the upper ends of ejector pins 261 to enter the lower mold and eject the bank strips 146 therein. At this time the lower mold section has moved downwardly with reference to the plates 128 and 173, and the wires 110 tend to support the strips above the mold, thus avoiding interference with the feeding of these strips out of the press.

Then the cylinders 155 are operated to produce feeding movements of wire feeding carriage 153 and bank strip feeding carriage.

It should be understood that each cavity plate and the corresponding mold assembly may be considered together as a mold or die element. In the same way the bed or frame 165 and the lower ram proper 125 may be considered together as a ram. Also the plates 300 and 310 may be considered as parts of an upper mold or die.

It should be understood that various changes may be made and that various parts may be used without others, without departure from the true scope and spirit of the invention.

What is claimed is:

1. Apparatus for making bank strips by molding insulating material on wires fed thereto comprising a movable lower ram; a lower mold on the central part of said lower ram, means for feeding wires over said lower mold and liftable with same ram; means for feeding bank strips away from said lower mold and liftable with said ram; an upper mold having channels in its upper face and tapered passages connecting the same to the mold cavity; a stripper plate above said mold to close the tops of said channels and having a central passage communicating with said channels; a fixed backing plate above said stripper plate; a nozzle projecting from said backing plate into the central passage in said stripper plate and having a downwardly flared central passage; upward movement of the lower ram lifting in succession the lower mold, the upper mold and the stripper plate and pressing them against the backing plate; means for injecting plastic into the closed mold through the backing plate, stripper plate, and upper mold, leaving a sprue therein, fixed sprue-holding means molded into the sprue below the stripper plate; said upper mold separating from the sprue as the lower ram descends; and means operated by the lower ram as it approaches its lowermost position to depress the stripper plate and release the sprue.

2. The combination according to claim 1 wherein the wire-feeding means and bank strip feeding means are lifted after a short preliminary movement of said lower ram during which the wires are engaged by said lower mold and said wires are locked against lengthwise movement.

3. Apparatus for making bank strips by molding insulating material on wires fed thereto, comprising a lower mold, means for feeding wires to said lower mold, means for feeding bank strips away from said lower mold, an upper mold suspended from above having at its lower face a mold cavity and at its upper face channels connected to the upper ends of tapered passages whose reduced lower ends communicate with the mold cavity, a stripper plate suspended from above shaped to close said channels and having a central passage, a fixed backing member above said stripper plate, means for moving said lower mold and said backing member toward each other to close the two molds and the stripper plate for molding and from each other for removal of bank strips from the molds, means for injecting plastic material through said central passage in the stripper plate in a downwardly flared stream, devices extending from the backing plate into the stripper plate and projecting from the lower face thereof when the stripper plate engages the backing plate so that the projecting parts are molded into the sprues and hold the stripper plate elevated, and means to break said connection when said molds are separated.

4. Apparatus for making bank strips by molding insulating material on wires fed thereto, comprising a multiple cavity lower mold for molding a plurality of bank strips simultaneously, a lower ram for raising and lowering said lower mold, means including an upper ram and an upper mold rendered effective by upward movement of said ram to close the cavities of the lower mold and provide passages for the injection of plastic material and by downward movement to separate the upper mold from sprues formed in the molding, a frame liftable by said ram, means for supporting said frame in its lowermost position to provide a preliminary movement of the ram before lifting the frame, wire-feeding means mounted on said frame at the entrance side of said lower mold, and bank-strip-removing means on the frame at the discharge side of the lower mold.

5. The combination according to claim 4 wherein the wire-feeding means comprises a device for guiding said wires in separated groups.

6. The combination according to claim 4 wherein the wire-feeding means comprises a plurality of separate groups of coaxial wire-guiding sheaves, and a member to hold the wires in the grooves of said sheaves.

7. The combination according to claim 4 wherein said wire-feeding means comprises a reciprocable carriage with wire-gripping plates between which said wires pass in separated groups, actuating means on said carriage to render said wire-gripping plates effective and then operate said carriage, and means on said frame to reciprocate said actuating means.

8. The combination according to claim 4 wherein said wire-feeding means comprises a reciprocatory carriage, the bank strip removing means comprises a reciprocatory carriage and both of said reciprocatory carriages are operated by fluid pressure cylinders mounted on said frame.

9. The combination according to claim 4 wherein there is an upper ram and said bank strip removing means comprises cut-off means for cutting off a plurality of bank strips at a time comprising a lower cutting device fixed on said frame and an upper cutting device spring held above said lower device and said upper device is operated by striking said upper ram to cut the wires between successive bank strips to sever a plurality of bank strips.

10. Apparatus for making bank strips of insulating material molded on terminal wires with projecting ends, comprising means for feeding a plurality of wires intermittently from a source of supply, a unit for molding bank strips around said plurality of wires at predetermined intervals thereon as said wires are advanced by said feeding means, and said molding unit comprising two opposed dies and means for closing and pressing said dies together, a bank strip cut-off device positioned at the forward end of the mold unit, operating mechanism for said cut-off device operatively associated with said die closing means whereby said device is operated at the end of each die closing and pressing movement and additional feeding means controlled by said molding unit being positioned to act on molded bank strips to automatically remove said bank strips from said molding unit and successively advance said strips away from said molding unit.

11. Apparatus for making bank strips of insulating material molded on terminal wires with projecting ends, comprising means for feeding a plurality of wires intermittently from a source of supply, a unit for molding bank strips around said plurality of wires at predetermined intervals thereon as said wires are advanced by said feeding means, and said molding unit comprising two opposed dies, means to close and open the same, means acting through said wires to withdraw molded bank strip bodies from one of said dies at the beginning of the separation of the dies and means to eject the bank strip bodies from the other die at the ends of the separation action, said ejecting means comprising reciprocatory ejector pins in bores extending into the hollow interior of the corresponding die, means to maintain the tips of said pins flush with the surface of said hollow interior while the dies are closed and to advance said pins as the separation of the dies is completed, additional feeding means controlled by said molding unit being positioned to act on molded bank strips to automatically remove said bank strips from said molding unit and successively advance said strips away from said molding unit.

12. Apparatus for making bank strips of insulating material molded on terminal wires with projecting ends, comprising means for feeding a plurality of wires intermittently from a source of supply, a unit for molding bank strips around said plurality of wires at predetermined intervals thereon as said wires are advanced by said feeding means, and said molding unit comprising a fixed upper ram, an upper mold section supported thereby, a movable lower ram with a lower mold section thereon, means to raise said ram, means on said lower mold to engage with said wires when said lower ram is raised and then to engage with said upper mold and press the same against said upper ram, and additional feeding means controlled by said molding unit being positioned to act on molded bank strips to automatically remove said bank strips from said molding unit and successively advance said strips away from said molding unit.

13. Apparatus for making bank strips of insulating material molded on terminal wires with projecting ends, comprising means for feeding a plurality of wires intermittently from a source of supply, a unit for molding bank strips around said plurality of wires at predetermined intervals thereon as said wires are advanced by said feeding means, and said molding unit comprising an upper mold, a fixed upper ram to support said upper mold, a movable lower ram, a lower mold mounted on said lower ram for cooperation with said upper mold, said lower mold including means operative after a short preliminary movement to engage said wire feeding means and said bank strip feeding means and carry them along with said lower mold as the latter engages said upper mold and presses it toward the upper ram, and additional feeding means controlled by said molding unit being positioned to act on molded bank strips to automatically remove said bank strips from said molding unit and successively advance said strips away from said molding unit.

14. Apparatus for making bank strips by molding insulating material on wires fed thereto, comprising a lower mold, a lower ram for raising and lowering said lower mold, means including an upper mold rendered effective by upward movement of the ram to close the molds and provide passage for the injection of plastic material, and by downward movement to separate the upper mold from sprues formed in the molding and from the molded bank strip, means for lowering the upper mold when the lower mold is lowered, means for feeding wires to the lower mold, means for feeding bank strips from the molds, said bank strip feeding means comprising a reciprocable carriage mounted above the lower mold for reciprocating movement in the direction of the wires, pawls pivoted on said carriage, and means on each pawl to engage the rear edge of a bank strip between predetermined of said wires.

15. Apparatus for making bank strips by molding insulating material on wires fed thereto, comprising a lower mold, a lower ram for raising and lowering said lower mold, means including an upper mold rendered effective by upward movement of the ram to close the molds and provide passage for the injection of plastic material, and by downward movement to separate the upper mold from sprues formed in the molding and from the molded bank strip, means for lowering the upper mold when the lower mold is lowered, means for feeding wires to the lower mold, means for feeding bank strips from the molds, said bank strip feeding means comprising pawls mounted above the lower mold for reciprocating in the direction of the wires, said pawls having means to engage the rear edges of bank strips to be fed, each pawl having a driving end fitting down between predetermined of said wires and having flared recesses to receive the intermediate wires between said predetermined wires.

16. Apparatus for making bank strips by molding insulating material on wires fed thereto, comprising a lower mold, a lower ram for raising and lowering said lower mold, means including an upper mold rendered effective by upward movement of the ram to close the molds and provide passage for the injection of plastic material, and by downward movement to separate the upper mold from sprues formed in the molding and from the molded bank strip, means for lowering the upper mold when the lower mold is lowered, means for feeding wires to the lower mold, said wire feeding means comprising a carriage mounted for reciprocation in the direction of the wires, wire gripping means on said carriage, said wire gripping means being rendered effective by the carriage operating means at the beginning of a forward movement of said carriage and ineffective upon the beginning of a return movement, additional wire gripping means mounted adjacent the molds, and means for rendering said additional gripping means effective at the beginning of an upward movement of said lower ram to hold said wires against lengthwise movement and ineffective as the ram approaches its lowermost position, means for feeding bank strips from the molds.

17. Apparatus for making bank strips by molding insulating material on wires fed thereto, comprising a lower mold, a lower ram for raising and lowering said lower mold, means including an upper mold rendered effective by upward movement of the ram to close the molds and provide passage for the injection of plastic material, and by downward movement to separate the upper mold from sprues formed in the molding and from the molded bank strip, means for lowering the upper mold when the lower mold is lowered, means for feeding wires to the lower mold, means for feeding bank strips from the molds, cutoff means mounted adjacent the molds in the path of the wires through the apparatus, and means for operating said cutoff means as the lower ram reaches its uppermost position to cut the wires between successive bank strips.

18. Apparatus for making bank strips by molding insulating material on wires fed thereto, comprising a lower mold, a lower ram for raising and lowering said lower mold, means including an upper mold rendered effective by upward movement of the ram to close the molds and provide passage for the injection of plastic material, and by downward movement to separate the upper mold from sprues formed in the molding and from the molded bank strip, means for lowering the upper mold when the lower mold is lowered, means for feeding wires to the lower mold, means for feeding bank strips from the molds, the wire feeding means and the strip-feeding means being mounted above the lower mold at its lowermost position and tending to lift molded bank strips from the lower mold as it approaches its lowermost position, and means for ejecting bank strips from said lower mold and support them above the same as the lower ram approaches its lowermost position.

19. Apparatus for making bank strips by molding insulating material on wires fed thereto, comprising a lower mold, a lower ram for raising and lowering said lower mold, means including an upper mold rendered effective by upward movement of the ram to close the molds and provide passage for the injection of plastic material, and by downward movement to separate the upper mold from sprues formed in the molding and from the molded bank strip, means for lowering the upper mold when the lower mold is lowered, ejector pins mounted for vertical movement in said ram and spring-pressed downwardly, a member vertically movable in said ram and engaging the lower ends of said member to rigidly support said pins with their tips forming parts of the inner surface of the mold, means to stop the downward movement of the pin-controlling member and project said pin into the mold to eject bank strips, means for feeding wires to the lower mold, means for feeding bank strips from the molds.

20. Apparatus for making bank strips of insulating material molded on terminal wires with projecting ends, comprising means for feeding a plurality of wires intermittently from a source of supply, a unit for molding bank strips around said plurality of wires at predetermined intervals thereon as said wires are advanced by said feeding means, and said molding unit comprising opposed dies between which said wires pass, means for moving said dies into mating engagement with each other and detent means mounted on said dies being operatively positioned to prevent backward movement of a previously finished bank strip upon movement of said dies, and additional feeding means controlled by said molding unit being positioned to act on molded bank strips to automatically remove said bank strips from said molding unit and successively advance said strips away from said molding unit.

WILLIAM F. SMITH.

REFERENCES CITED

The following references are of record in the file of this patent:

UNITED STATES PATENTS

| Number | Name | Date |
|---|---|---|
| 2,191,882 | Ernst et al. | Feb. 27, 1940 |
| 2,224,980 | Morin | Dec. 17, 1940 |
| 2,351,582 | Bohrer | June 20, 1944 |
| 2,386,697 | Lynch | Oct. 9, 1945 |
| 2,415,961 | Nast | Feb. 18, 1947 |

OTHER REFERENCES

Ser. No. 285,944, Swarovski (A. P. C.), published April 27, 1943.